United States Patent
Leigh et al.

(10) Patent No.: US 11,415,763 B2
(45) Date of Patent: Aug. 16, 2022

(54) RIGID-PLANE OPTICAL JUMPER FOR PLUGGABLE OPTICAL TRANSCEIVERS

(71) Applicant: HEWLETT PACKARD ENTERPRISE DEVELOPMENT LP, Houston, TX (US)

(72) Inventors: Kevin B. Leigh, Houston, TX (US); Sagi Varghese Mathai, Milpitas, CA (US); Michael Renne Ty Tan, Milpitas, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/988,428

(22) Filed: Aug. 7, 2020

(65) Prior Publication Data
US 2022/0043223 A1    Feb. 10, 2022

(51) Int. Cl.
| | |
|---|---|
| *H04B 10/00* | (2013.01) |
| *G02B 6/42* | (2006.01) |
| *H04B 10/40* | (2013.01) |
| *G02B 6/38* | (2006.01) |

(52) U.S. Cl.
CPC ........ *G02B 6/4261* (2013.01); *G02B 6/3897* (2013.01); *G02B 6/4219* (2013.01); *G02B 6/4246* (2013.01); *H04B 10/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,943,461 A | * | 8/1999 | Shahid ................... | G02B 6/421 385/92 |
| 6,821,027 B2 | * | 11/2004 | Lee ....................... | G02B 6/4249 385/89 |
| 6,934,450 B2 | * | 8/2005 | Hiramatsu ........... | G02B 6/4292 385/126 |
| 7,021,833 B2 | * | 4/2006 | Loh ...................... | G02B 6/4214 385/88 |

(Continued)

FOREIGN PATENT DOCUMENTS

DE    3630382 A1    3/1988

*Primary Examiner* — Agustin Bello
(74) *Attorney, Agent, or Firm* — Hewlett Packard Enterprise Patent Department

(57) ABSTRACT

Pluggable optical transceiver modules are described herein that are specifically configured to preclude use of fiber jumpers inside of the module. Pluggable optical transceiver modules implement a rigid-plane jumper that provides an opto-mechanical interface between an external fiber cable (attached to the pluggable optical transceiver module) and the optical transceiver in a manner that does not require the fiber jumper, while ensuring reduced optical loss. In some embodiments one or more rigid waveguide plates act as an opto-mechanical coupling between the external fiber cable and on-board opto-electrical components (e.g., optical transceiver). For example, the rigid waveguide plates are coupled to a faceplate connector, and a CWDM block that is in turn optically coupled to the optical socket. In some embodiments, the CWDM block is directly attached to the rigid waveguide plates. In some embodiments, the CWDM block is indirectly attached to the rigid waveguide plates using a half periscope.

10 Claims, 20 Drawing Sheets

(56) References Cited

U.S. PATENT DOCUMENTS

| | | | | |
|---|---|---|---|---|
| 7,785,020 B2* | 8/2010 | Kim | G02B 6/4246 | 385/92 |
| 7,941,053 B2* | 5/2011 | Dallesasse | H04B 10/40 | 398/139 |
| 8,483,571 B2* | 7/2013 | McColloch | G02B 6/4214 | 398/141 |
| 8,485,738 B2* | 7/2013 | Rosenberg | G02B 6/3829 | 385/76 |
| 8,529,140 B2* | 9/2013 | McColloch | G02B 6/423 | 385/89 |
| 8,588,561 B2* | 11/2013 | Zbinden | H05K 7/20418 | 385/14 |
| 8,641,299 B2* | 2/2014 | Daikuhara | G02B 6/3897 | 385/93 |
| 8,926,199 B1* | 1/2015 | Chan | G02B 6/4249 | 385/93 |
| 8,961,037 B2* | 2/2015 | Nishimura | G02B 6/4214 | 385/88 |
| 9,279,943 B1* | 3/2016 | McColloch | G02B 6/3839 | |
| 9,363,020 B2* | 6/2016 | Kurashima | H04B 10/801 | |
| 9,383,519 B2* | 7/2016 | Yi | G02B 6/36 | |
| 9,389,374 B2* | 7/2016 | Ertel | H05K 1/0274 | |
| 9,553,671 B1* | 1/2017 | Nagarajan | G02B 6/4246 | |
| 9,612,405 B2* | 4/2017 | Aoki | G02B 6/381 | |
| 9,671,580 B1* | 6/2017 | Nagarajan | H04B 1/3833 | |
| 9,671,581 B2* | 6/2017 | Nagarajan | G02B 6/4251 | |
| 9,739,944 B1* | 8/2017 | Fermor | G02B 6/4292 | |
| 9,778,420 B2* | 10/2017 | Shimizu | G02B 6/34 | |
| 9,798,087 B1* | 10/2017 | Mathai | G02B 6/4215 | |
| 9,880,366 B2* | 1/2018 | Vallance | G02B 6/29367 | |
| 10,025,043 B2* | 7/2018 | Vallance | G02B 6/4249 | |
| 10,175,431 B2* | 1/2019 | Lin | G02B 6/12019 | |
| 10,191,221 B1* | 1/2019 | Leigh | G02B 6/4292 | |
| 10,241,275 B2* | 3/2019 | Li | G02B 6/3818 | |
| 10,295,763 B2* | 5/2019 | Ho | H04B 10/40 | |
| 10,466,432 B2* | 11/2019 | Luo | G02B 6/425 | |
| 10,466,433 B2* | 11/2019 | Epitaux | G02B 6/4292 | |
| 10,520,680 B2* | 12/2019 | Li | G02B 6/4214 | |
| 10,680,736 B2* | 6/2020 | Li | G02B 6/428 | |
| 10,754,108 B2* | 8/2020 | Matsuoka | G02B 6/4244 | |
| 10,795,103 B2* | 10/2020 | Rosenberg | G02B 6/4269 | |
| 10,877,232 B1* | 12/2020 | Bailey | H01R 13/639 | |
| 10,897,122 B2* | 1/2021 | Mathai | H01S 5/02253 | |
| 2006/0274997 A1* | 12/2006 | Furuno | G02B 6/4292 | 385/89 |
| 2006/0291782 A1* | 12/2006 | Carpenter | G02B 6/3636 | 385/49 |
| 2007/0183724 A1* | 8/2007 | Sato | G02B 6/4292 | 385/89 |
| 2008/0044141 A1* | 2/2008 | Willis | G02B 6/3887 | 385/88 |
| 2008/0226228 A1* | 9/2008 | Tamura | G02B 6/4214 | 385/33 |
| 2009/0226181 A1* | 9/2009 | Fingler | G02B 6/4441 | 398/139 |
| 2009/0310907 A1* | 12/2009 | Ikeda | G02B 6/43 | 385/14 |
| 2010/0135618 A1* | 6/2010 | Howard | G02B 6/4214 | 385/79 |
| 2011/0123151 A1* | 5/2011 | Zbinden | G02B 6/4214 | 385/33 |
| 2012/0213475 A1* | 8/2012 | Selli | G02B 6/4228 | 385/33 |
| 2013/0294730 A1* | 11/2013 | Leigh | G02B 6/4292 | 385/53 |
| 2014/0064676 A1* | 3/2014 | McColloch | G02B 6/425 | 385/92 |
| 2014/0193160 A1 | 7/2014 | Yagisawa et al. | | |
| 2014/0248057 A1* | 9/2014 | Li | G02B 6/4446 | 398/82 |
| 2015/0338585 A1* | 11/2015 | Li | G02B 6/4224 | 385/31 |
| 2016/0091684 A1* | 3/2016 | Van Cauteren | G02B 6/4494 | 385/135 |
| 2016/0192044 A1* | 6/2016 | Raza | H04B 10/40 | 398/49 |
| 2017/0212320 A1* | 7/2017 | Hara | G02B 6/4206 | |
| 2017/0261701 A1* | 9/2017 | Izawa | G02B 6/26 | |
| 2018/0225487 A1* | 8/2018 | Leigh | G02B 6/4201 | |
| 2018/0299632 A1* | 10/2018 | Van Baelen | G02B 6/4466 | |
| 2020/0081208 A1* | 3/2020 | Leigh | G02B 6/4277 | |
| 2020/0150364 A1 | 5/2020 | Leigh et al. | | |
| 2020/0158969 A1* | 5/2020 | Leigh | G02B 6/4292 | |
| 2020/0166718 A1* | 5/2020 | Takeuchi | G02B 6/3895 | |
| 2020/0192035 A1* | 6/2020 | Leigh | G02B 6/4415 | |
| 2020/0341219 A1* | 10/2020 | Zhou | G02B 6/428 | |

* cited by examiner

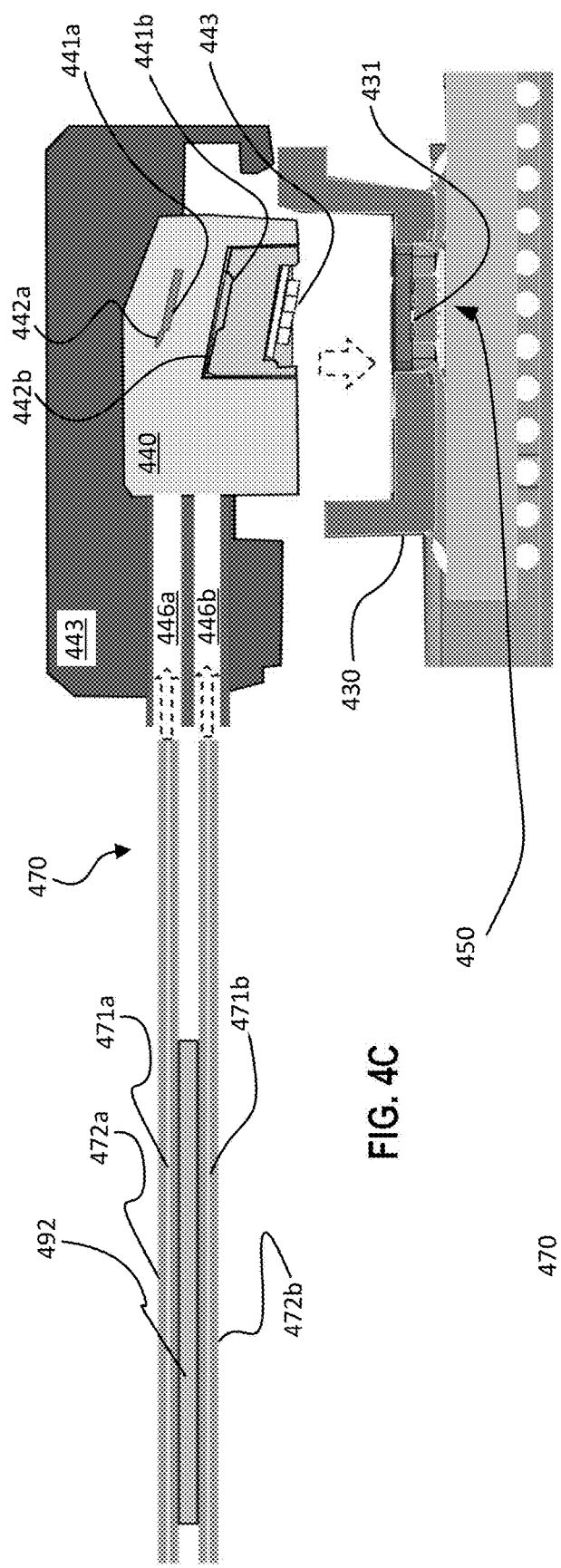
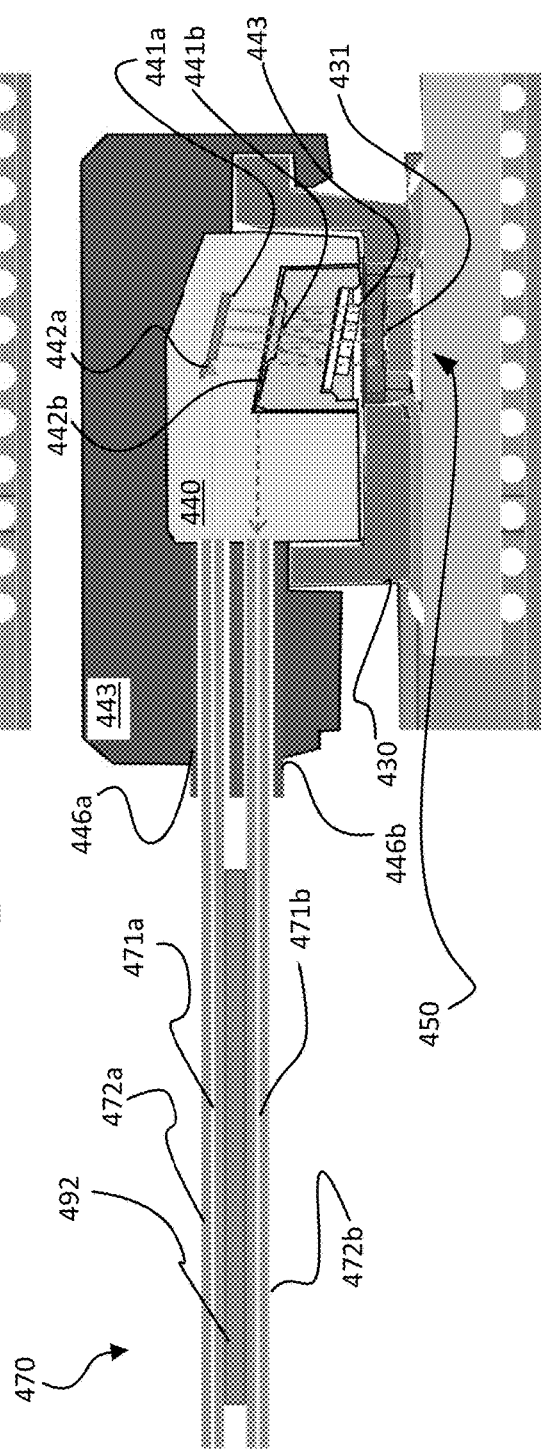
FIG. 4C
FIG. 4D

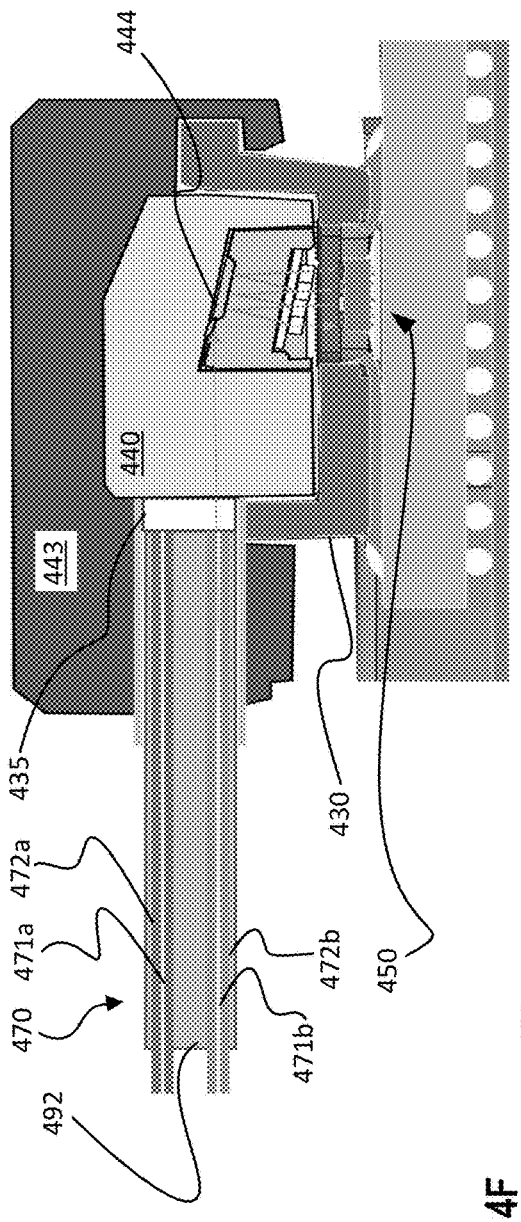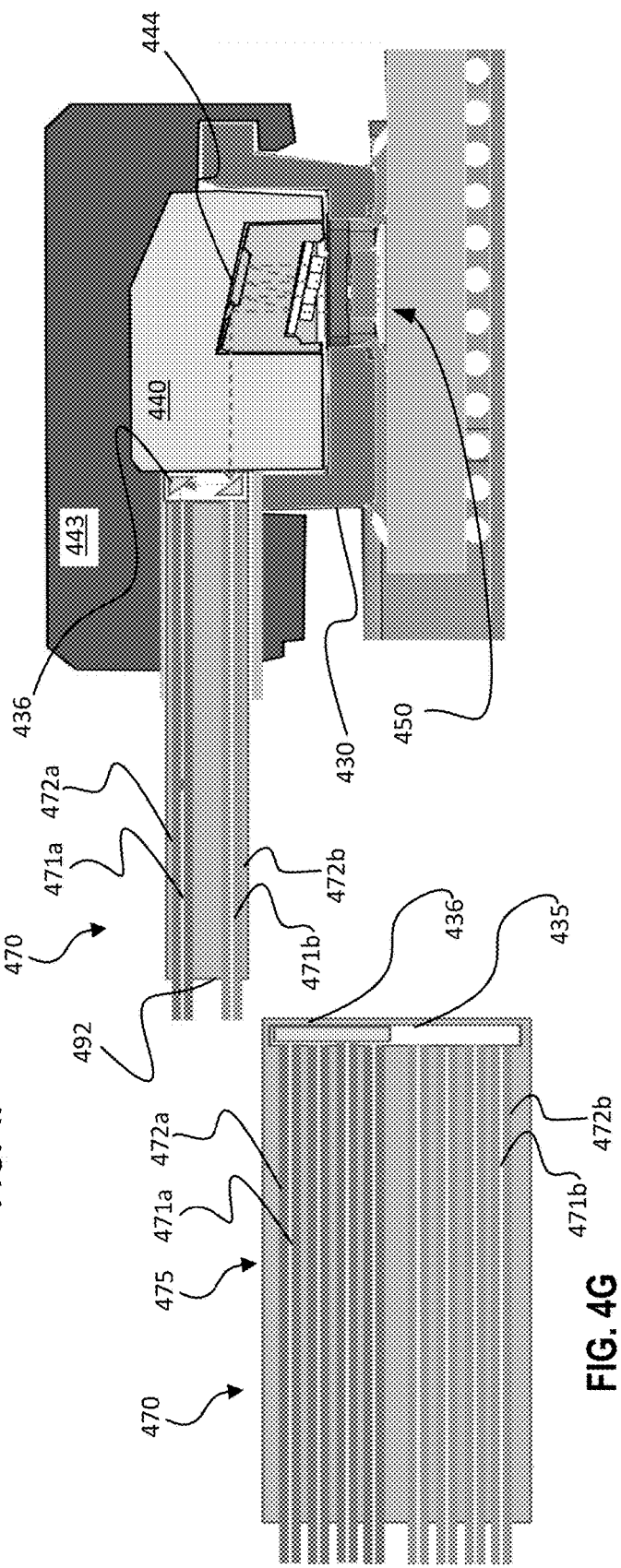
FIG. 4E
FIG. 4F
FIG. 4G

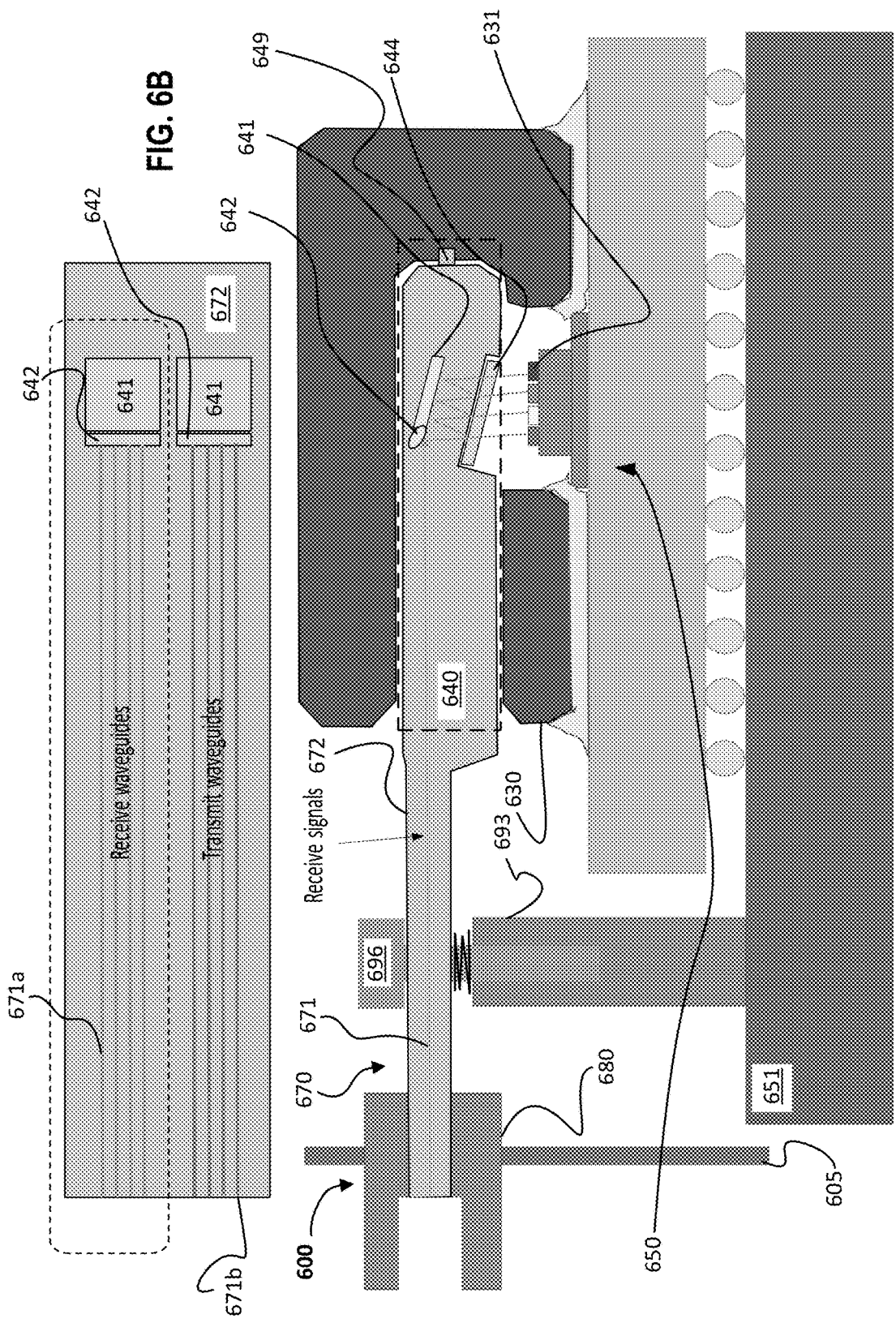

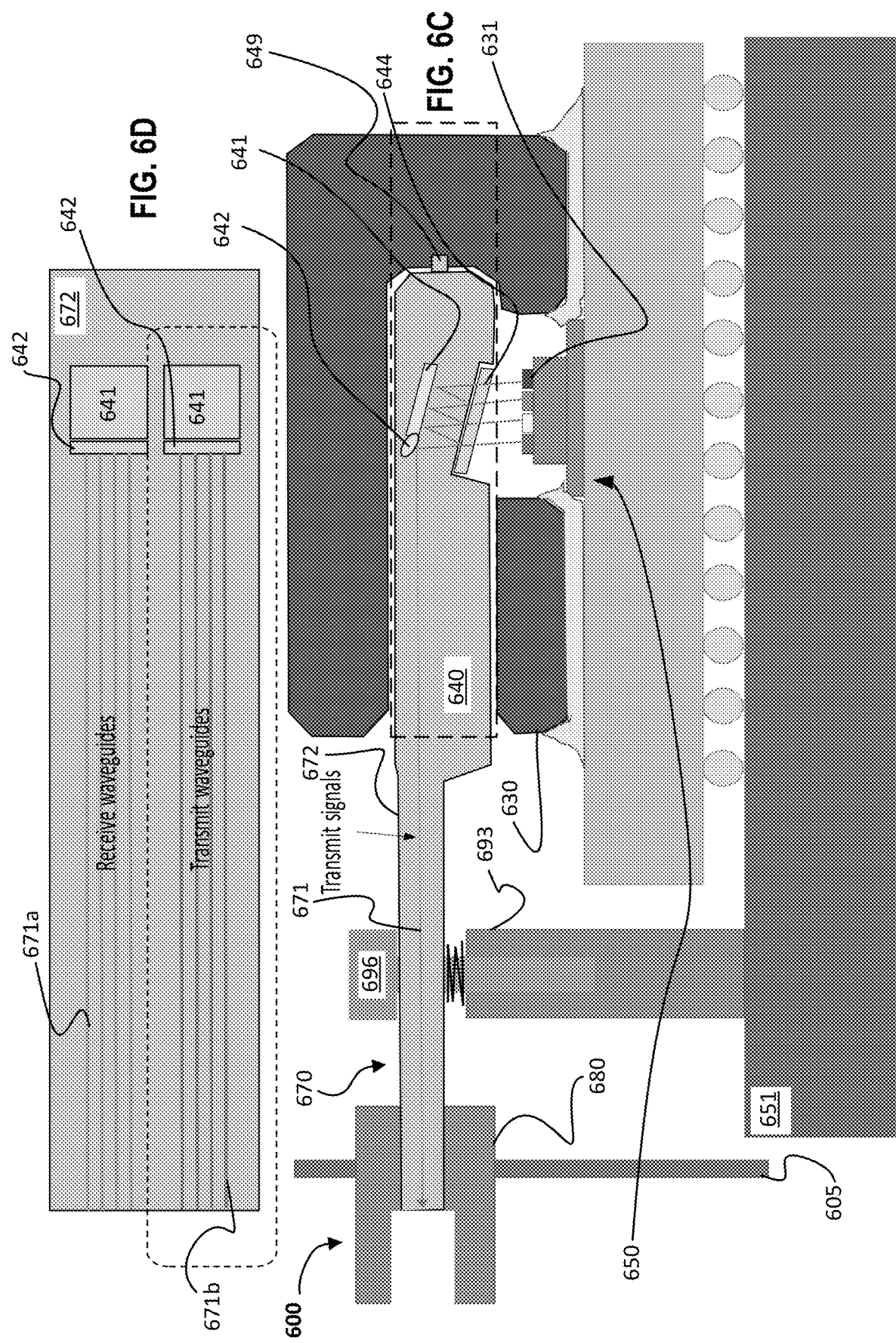

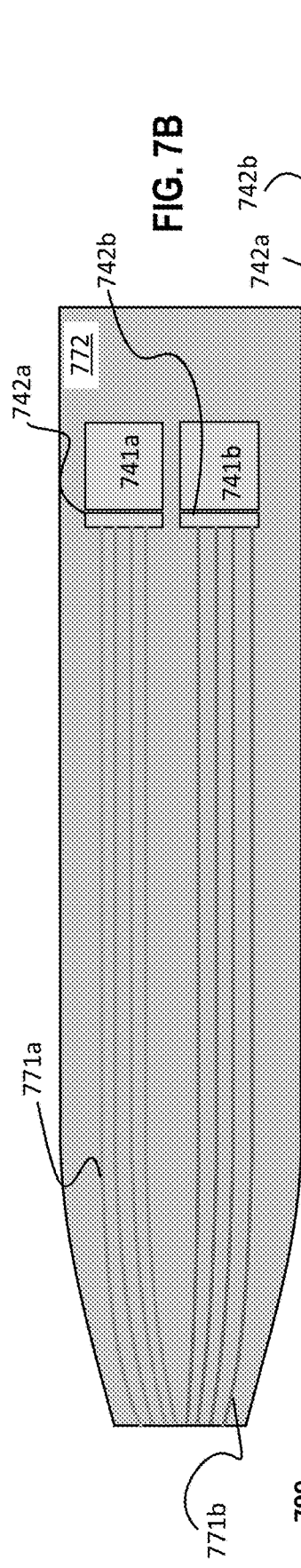

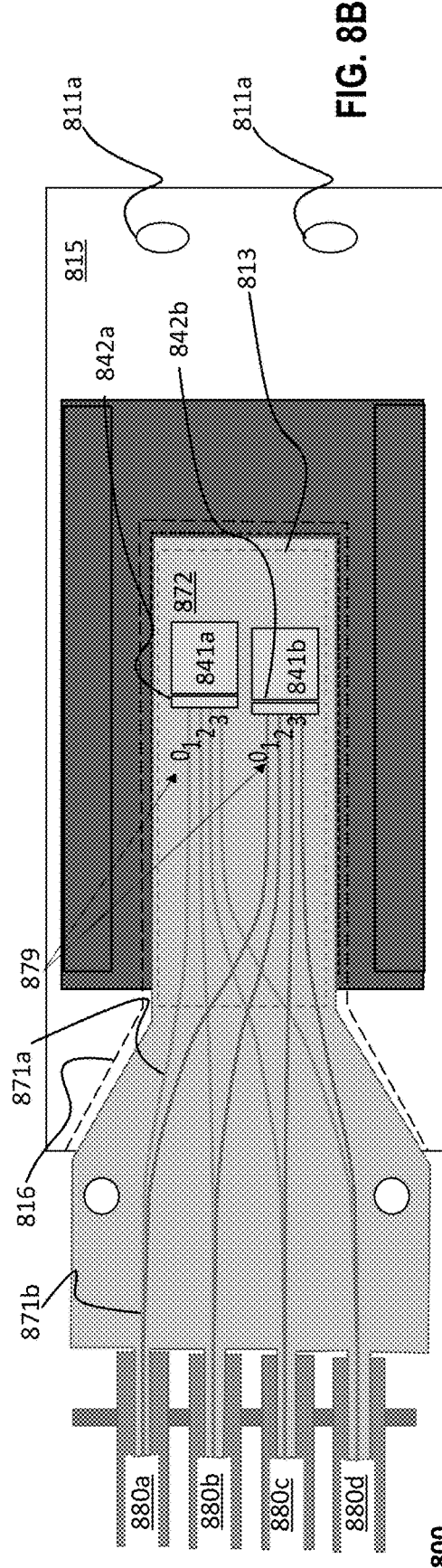

RIGID-PLANE OPTICAL JUMPER FOR PLUGGABLE OPTICAL TRANSCEIVERS

BACKGROUND

Optical communication technology is used in some computing networks to increase speed, cable length and overall bandwidth for communication between different networking devices (e.g., server device to a network router, among network switches). The optical signals received at the faceplate by such devices are generally converted into electrical signals at the system interface side and routed through the networking device over electrical connectors and traces. Conversely, optical signals can be transmitted by the networking device. For example, electrical signals can be converted into optical signals which are transmitted from the system interface side of the networking device. Optical components are increasingly being integrated into networking devices.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 4C illustrates another example of a multi-plane single-layer rigid-plane optical jumper including a CWDM block directly attached thereto and an example position for the CWDM block with respect to coupling with an optical socket, in accordance with an embodiment of the technology disclosed herein.

FIG. 4D illustrates another example of the multi-plane single-layer rigid-plane optical jumper including the CWDM block directly attached thereto and another example position for the CWDM block with respect to coupling with an optical socket, in accordance with an embodiment of the technology disclosed herein.

FIG. 4E illustrates another example of the multi-plane single-layer rigid-plane optical jumper including the CWDM block indirectly attached thereto with a periscope, in accordance with an embodiment of the technology disclosed herein.

FIG. 4F illustrates another example of the multi-plane single-layer rigid-plane optical jumper including the CWDM block indirectly attached thereto with the periscope, in accordance with an embodiment of the technology disclosed herein.

FIG. 4G illustrates a top view of an example of a rigid waveguide assembly that can be used to construct a single-layer rigid-plane optical jumper, in accordance with an embodiment of the technology disclosed herein.

FIG. 6A illustrates yet another example of a pluggable optical transceiver module including another example configuration for a rigid-plane optical jumper, including a CWDM block embedded within a single-plane single-layer rigid-plane optical jumper, in accordance with an embodiment of the technology disclosed herein.

FIG. 6B illustrates a top view of the CWDM block embedded within the single-plane single-layer rigid-plane optical jumper shown in FIG. 6A, in accordance with an embodiment of the technology disclosed herein.

FIG. 6C illustrates yet another example of the pluggable optical transceiver module including the CWDM block embedded within the single-plane single-layer rigid-plane optical jumper, in accordance with an embodiment of the technology disclosed herein.

FIG. 6D illustrates a top view of the CWDM block embedded within the single-plane single-layer rigid-plane optical jumper shown in FIG. 6C, in accordance with an embodiment of the technology disclosed herein.

FIG. 7A illustrates yet another example of a pluggable optical transceiver module including another example configuration for a rigid-plane optical jumper, including a CWDM block embedded within a single-plane transitional-layers rigid-plane optical jumper, in accordance with an embodiment of the technology disclosed herein.

FIG. 7B illustrates a top view of the CWDM block embedded within the single-plane transitional-layers rigid-plane optical jumper shown in FIG. 7A, in accordance with an embodiment of the technology disclosed herein.

FIG. 8A illustrates yet another example of a pluggable optical transceiver module including another example configuration for a rigid-plane optical jumper, including a CWDM block embedded within a single-plane multi-layer rigid-plane optical jumper, in accordance with an embodiment of the technology disclosed herein.

FIG. 8B illustrates a top view of the CWDM block embedded within the single-plane multi-layer rigid-plane optical jumper shown in FIG. 8A, in accordance with an embodiment of the technology disclosed herein.

Figure 1A:
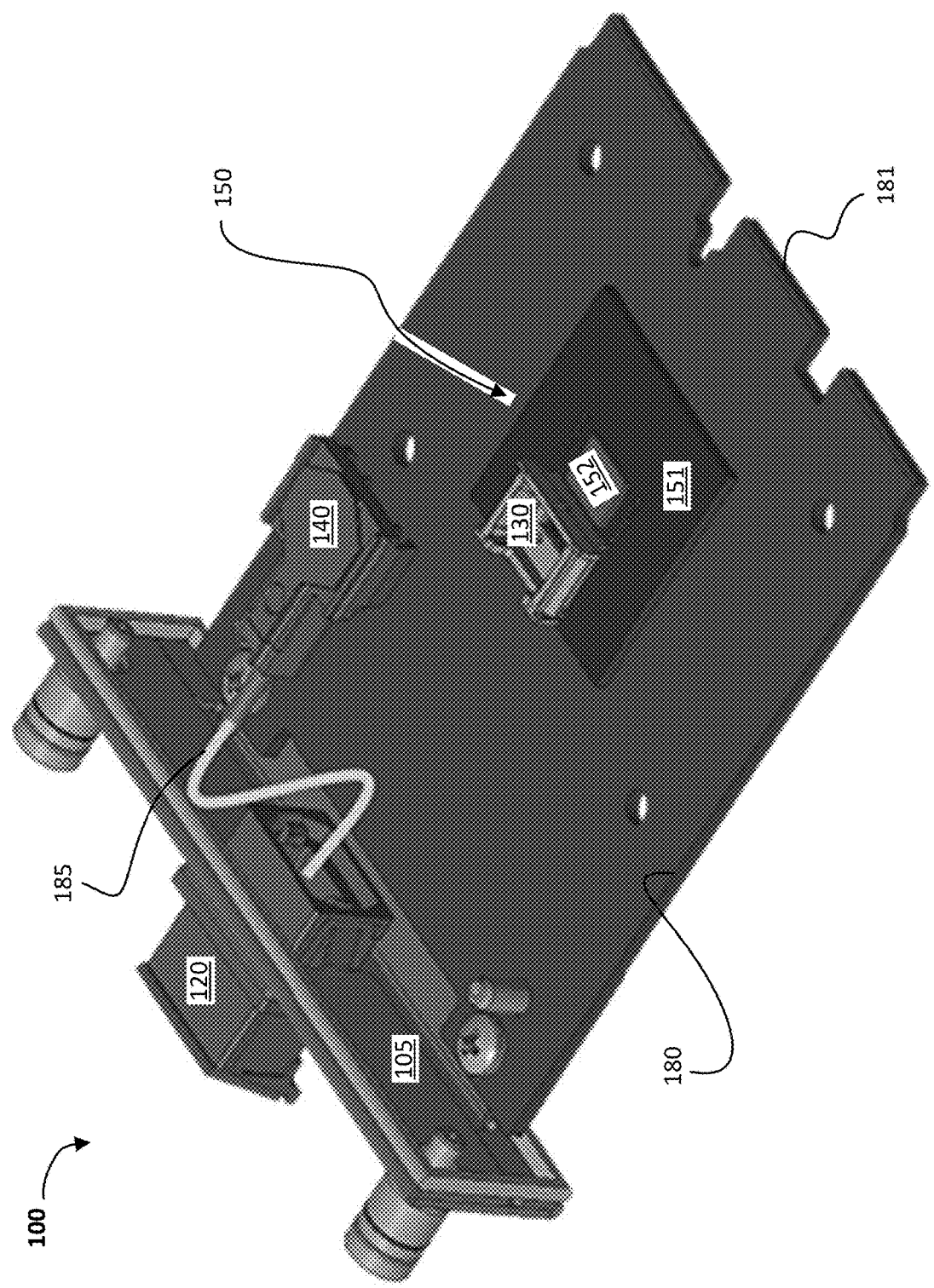
FIG. 1A illustrates an example of a pluggable optical transceiver module.

The figures are not exhaustive and do not limit the present disclosure to the precise form disclosed.

DETAILED DESCRIPTION

To improve efficiency and throughput, optics are increasingly being integrated within system devices. Pluggable modules (e.g., quad small form-factor pluggable (QSFP) modules) in the form of optical transceivers provide a conversion point between electrical and optical signals on the system device's faceplate. However, such optical transceiver pluggable modules are generally inefficient in cost, electrical signal integrity, thermal management, module management, printed circuit board (PCB) area utilization, faceplate area utilization, and optical cable management. For instance, moving the optical transceivers closer to processing components within system devices can reduce the distance of electrical traces linking the optical transceiver and the processing component, thereby increasing system performance and signal integrity. However, being able to achieve an efficient and compact design is thwarted in some standard pluggable modules, as a fiber jumper is typically used to connect the optical transceiver to the faceplate connectors. For example, some pluggable modules used in the industry employ multiple faceplate optical connectors (e.g., Lucent Connector (LC) duplex) and a chip optical connector to connect to the optical transceiver chip (via an optical socket). In another example, some pluggable modules used in the industry employ a faceplate optical connector (e.g., multi-fiber push on (MPO)) and a chip optical connector to connect to the optical transceiver chip (via an optical socket). In order to address distance caused by a physical separation between the MPO connector and the chip optical connector in the module, a fiber jumper is commonly used. Nonetheless, this additional interface from the fiber jumper is associated with drawbacks, such as optical loss (due to fiber bends and potential inconsistent multiple fibers terminated at the chip optical connector and faceplate optical connectors), space inefficiencies (due to limited minimum distance between a chip optical connector and a faceplate to accommodate long enough fiber lengths to terminate to chip optical connector and faceplate optical connectors), and cost increases (due to difficulties to terminate short fibers). The pluggable modules described herein are designed to mitigate these problems. Different examples of pluggable optical transceiver modules implementing an opto-mechanical interface (e.g., via a direct connection or via an additional interface) between an external fiber cable and the optical transceiver in a manner that does not require use of a fiber jumper, are disclosed herein, while ensuring that the alignment tolerances between opto-mechanical elements are tight enough to properly align optical signals. In some embodiments, optical transceiver modules are designed to achieve a direct opt-mechanical coupling between the external fiber cable and board-end opto-electronic components (e.g., optical transceiver) in the module.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Referring now to FIG. 1A an example of an existing pluggable optical transceiver module 100 is depicted. As shown, the pluggable optical transceiver module 100 is configured as a horizontally flat and rigid board 180, such as a printed circuit board (PCB), which can be considered as the bottom plane of the module 100. The board 180 has a faceplate 105 attached substantially orthogonally thereto at an end surface, forming a generally "L" shape. This allows for the faceplate 105 to serve as a form of termination point, creating a barrier between external components (outside of the module 100), such as an external optical cable, that may be part of a system which is connected to the module 100, and the internal components of the module 100 itself.

The pluggable optical transceiver module 100 also includes an application-specific integrated circuit (ASIC) 152 that is mounted to a top surface of a chip substrate 151 (also referred to as transceiver board). The chip substrate 151 is further mounted to the module board 180. Additionally, a chip optical connector 140 is shown. In the illustrated example, an optical socket 130 is also mounted onto the chip substrate 151, proximate to the ASIC 152. The optical socket 130 surrounds the opto-electronics disposed on the chip substrate 151. The chip substrate 151 encompasses opto-electronics for converting optical signals into electronic signals (and vice versa) and ASIC 152 to transmit/receive electrical signals between the opto-electronics and system interface 181. The system interface 181 may comprise high-speed electrical signals, low-speed management electrical signals and electrical power connections to a system.

The chip optical connector 140 has integrated micro-optics, such as mirrors, lenses, optical multiplexer/demultiplexer, and wavelength filters. The chip substrate 151 has opto-electronics, such as VCSEL (vertical cavity surface emitting lasers), PD (photodetectors), and lenses. The chip substrate 151 also has an optical socket 130, where the optical socket 130 has an opening at its bottom that exposes the aforementioned opto-electronics. Optical socket 130 and chip optical connector 140 have complimentary alignment features to ensure the micro-optics on the underside of the chip optical connector 140 will be opto-mechanically aligned with the opto-electronics within the optical socket 130. When the chip optical connector 140 is connected to the optical socket 130, these aforementioned micro-optics in the chip optical connector 140 and opto-electronics within the optical socket 130 on the chip substrate 151 operate together to impart CWDM (coarse wave-division multiplexing, where "coarse" refers to be multiple number of wavelengths up to eight) optical transceiver capabilities. In other words, when the chip optical connector 140 is seated inside the optical socket 130, the integrated micro-optics of the chip optical connector 140 and the opto-electronics of the optical socket 130 are aligned in a manner that allows multi-wavelength light signals to be coupled between them, ultimately implementing the CWDM optical transceiver capabilities. These micro-optics within the chip optical connector 140 and opto-electronics within the optical socket 130, which form the CWDM optical transceiver 150 are discussed in greater detail in reference to FIG. 1B. As background, an optical transmitter may electronically modulate a carrier light provided by a laser to convey information over an optical channel, converting electrical signals to optical signals on a transmit channel. An optical transmitter is normally accompanied by an optical receiver across an optical fiber. An optical receiver converts detected light signals to electrical signals. An optical transmitter and optical receiver together form an optical transceiver. Similarly, the CWDM optical transceiver 150 can convey information over an optical channel (e.g., transmit and receive optical signals).

Referring now to the faceplate 105 of the pluggable optical transceiver module 100, a faceplate connector receptacle 120 is illustrated as being inserted through an aperture in the faceplate's 105 surface. The faceplate connector receptacle 120 is a receptacle into which an external cable connector, such as an MPO connector (not shown) having an MT (mechanical transfer) ferrule and an MT ferrule terminated internal fiber jumper 185 may be plugged to enable precise optical coupling between the external fiber optic cable and the internal fiber optic jumper. In order for an optical connection to be established between the faceplate connector receptacle 120 and the optical socket 130, a short fiber jumper 185 terminated with an MT ferrule is run from the faceplate connector receptacle 120 and terminated at the chip optical connector 140. That is, there is a short distance between the faceplate connector receptacle 120 (disposed at the faceplate 105) and the optical socket 130 (farther away from the faceplate 105) that must be traversed in order for the chip optical connector 140 to interface with both the faceplate connector receptacle 120 and the optical socket 130. Although substantially short in length, this distance must be accounted for, in order for the optical connection to be appropriately established. Consequently, use of the fiber jumper 185 is required in this configuration of the pluggable optical transceiver module's 100 configuration.

As an example, the pluggable optical transceiver module 100 may be installed in a system, such as a network switch. Continuing with the example of a network switch, the pluggable transceiver module 100 can be inserted, or "plugged", into the network switch, for example plugging the module 100 into a bay that is suitable for receiving and/or interacting with the module 100 (based on the dimensions, configuration, and capabilities of the module 100). After insertion, the faceplate 105 terminates one end of the pluggable optical transceiver module 100 at an external surface of the network switch, while the other end of the module 100 (including the CWDM optical transceiver 150) is housed within the network switch. Generally speaking, any elements outside of the faceplate 105 (e.g., to the left of the faceplate 105 in FIG. 1A), can be considered external to the pluggable optical transceiver module 100, and any elements inside of the faceplate 105 (e.g., to the right of the faceplate 105 in FIG. 1A) can be considered internal to the module 100. Referring again to the example, the switch can be inside of an enclosure that includes additional switches and multiple optical connectors for receiving inter-switch links, such as external optical cables. These optical connectors can be implemented as any optical connector deemed appropriate for optical communication links for switches. Accordingly, an external optical cable can be used for connecting a switch, having the pluggable optical transceiver module 100 installed therein, to another switch by connecting this external cable to faceplate connector receptacle 120. It should be appreciated that the abovementioned example is for purposes of discussion, and not intended to be limiting. To this end, the pluggable optical transceiver module 100 and other configurations described herein can be used in various other system configurations, for instance with leaf switch line-cards, which are modular electronic circuits (disposed on PCB) designed to fit within a bay or other connector of a larger PCB (e.g., a motherboard of a core switch).

In some embodiments, the faceplate connector receptacle 120 is implemented to accept a MPO connector. MPO connectors are fiber connectors comprised of multiple optical fibers. While defined as an array connector having more than 2 fibers, MPO connectors are typically available with 8, 12, 16 or 24 fibers for common data center LAN (local area network) applications.

Figure 1B:
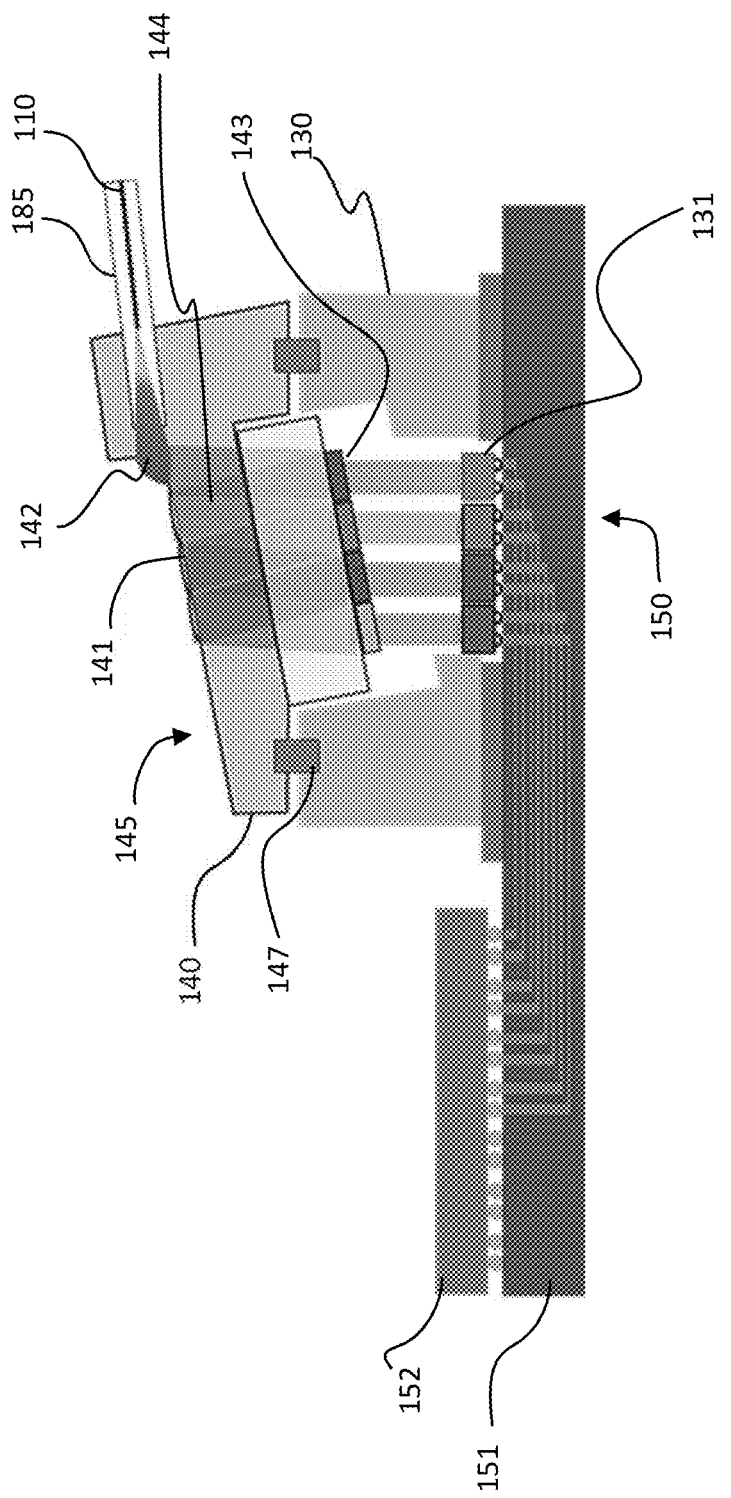
FIG. 1B illustrates an example of a coarse wave-division multiplexing (CWDM) optical transceiver that may be integrated into the pluggable optical transceiver module shown in FIG. 1A.

Referring now to FIG. 1B, an example of the CWDM optical transceiver 150 that can be integrated into the pluggable optical transceiver module (shown in FIG. 1A) is more prominently shown. The CWDM optical transceiver 150 can have an integrated circuit (IC) chip 152, such as an ASIC, coupled to a chip substrate 151. The ASIC 152 may be a transceiver device, a switch device, a computing device, an accelerator device, a storage device, a memory device, etc. The chip optical connector 140 may be an optical connector consisting of micro-optics. A set of micro-optics that are integrated in the chip optical connector 140 may include, but are not limited to: an injection molded ferrule 145 (that further comprises relay mirrors 141, a turning lens 142, and an optical zig-zag multiplexer/demultiplexer (mux/demux) 144) and a CWDM wavelength filter block 143. The chip optical connector 140 can also include various mechanical components, such as alignment features 147 that allow the chip optical connector 140 to be properly aligned and seated to the optical socket 130, thereby ensuring that the micro-optics of the chip optical connector 140 and the opto-electronics within the optical socket 130 are suitably aligned for the CWDM optical transceiver 150 to function. Additionally, the injection molded ferrule 145 comprises optical fiber terminating features for optical fibers 110 of a jumper 185.

Referring to the CWDM optical transceiver 150, there are additional opto-electronics, namely VCSEL (vertical cavity surface emitting laser) arrays 131 that may act as a light source. For example, light from the VCSEL arrays 131 can be emitted at multiple wavelengths and ultimately traverse the optical zig-zag multiplexer/demultiplexer 144 in the chip optical connector 140 before being directed to ingress into the fiber jumper 110 for transmission. During an operation, the CWDM optical transceiver 150 may use a VCSEL as a light transmitting element and a photodetector (PD) as a light receiving element. Each VCSEL may be modulated by an electrical signal to produce a light signal with a carrier having a specific wavelength or wavelength range, and each photodetector may detect a light signal within a range of wavelengths.

As a general description, mating the chip optical connector 140 with the optical socket 130 enables function of the abovementioned components of the CWDM optical transceiver 150. For example, a light signal ingress to the fiber jumper 185 (e.g., transmit) may be for the optical signals emitted by the array of VCSELs 131, and a light egress from the fiber jumper 185 (e.g., receive) may be for the optical signals received by the array of PDs (not shown in FIG. 1B). A sequence of deflecting mirrors and wavelength filters may be needed to multiplex (or combine) the transmitted light signals by an array of VCSELs 131. Similarly, a sequence of deflecting mirrors and wavelength filters may be needed to demultiplex (or separate) the received light signals by the array of PDs (not shown in FIG. 1B). Although the embodiments are discussed in the context of CWDM, it should be appreciated that the pluggable optical transceiver modules disclosed herein can be implemented in accordance with other optical signaling technologies, such as wave division multiplexing (WDM), as deemed appropriate.

Referring back to FIG. 1A, the configuration of the pluggable optical transceiver module 100 is useful in many existing optical transmission systems. However, the use of the fiber jumper 185 may be associated with some drawbacks that can impact performance and efficiency of the optical transceiver 150. For instance, the fiber jumper 185 adds another interface (e.g., interface at the MPO connector side), which can potentially experience optical loss. Moreover, the fiber jumper 185 has an associated labor cost for two fiber termination points in addition to individual components cost, which can further increase expenses in large-scale systems where the number of fiber jumpers used can be significantly higher. Even further, with the distance between the faceplate connector receptacle 120, which extends from the surface of the faceplate 105, and the optical socket 130 being substantially small, the fiber jumper 185 may have tight bend radii to fit within a small confined space and may introduce optical power losses due to tight fiber bends. Thus, the fiber jumper 185 has to be a certain length, preferably the same as the distance from the optical socket 130 to the faceplate connector receptacle 120.

Further, a distance and volume space between the ferrule of the chip optical connector 140 and the faceplate 105 must be large enough to accommodate various differing fiber assemblies that can use a plurality of fiber jumpers (e.g., fiber jumper 185). As an example of a fiber assembly, one chip ferrule can fan out to multiple faceplate ferrules. In another example of a fiber assembly, parallel fiber ferrules can include 12-16 fibers in a ferrule on the faceplate that can be associated with the number of fibers on the chip ferrule. However, if the distance and volume decreases between the chip optical connector 140 and the faceplate 105 (in the configuration of some other optical transceiver modules), it becomes increasingly more impractical that this tight space has the dimensions suitable for a wide range of different fiber assemblies. Also, some fiber assemblies are assembled manually and can be very expensive as the configuration increases in scale and complexity. The rigid-plane optical jumper disclosed herein provides a rigid opto-mechanical structure as an interface that couples the opto-electronics on the optical transceiver and the faceplate connector, which can be manufactured with more automated processes and can circumvent the need for fiber jumpers and manually constructed fiber assemblies. Moreover, use of the disclosed rigid-plane optical jumper can improve link budget by reducing loss associated with additional optical connector interfaces that are present in previous configurations of the module, namely loss related to the fiber jumper interfaces.

Figure 2:
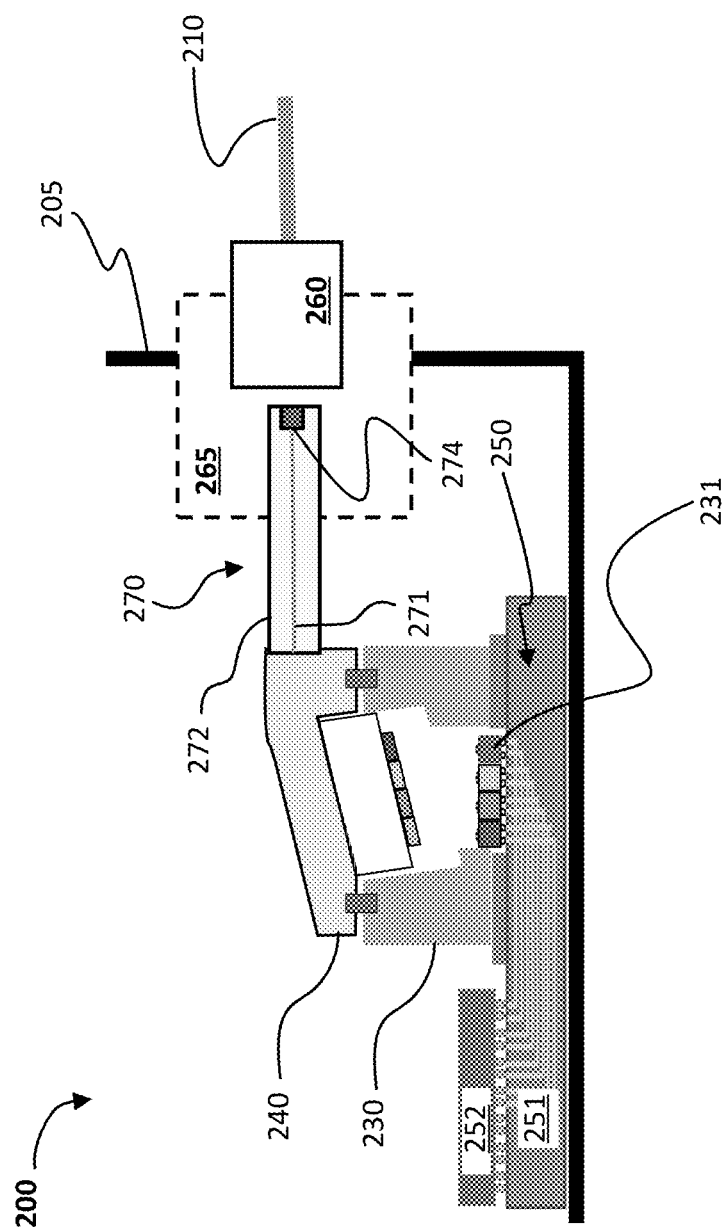
FIG. 2 illustrates an example of a pluggable optical transceiver module including a rigid-plane optical jumper providing an opto-mechanical connection to an optical socket, in accordance with an embodiment of the technology disclosed herein.

Referring now to FIG. 2, a side cross-sectional view of an example of a pluggable optical transceiver module 200 that implements a rigid-plane optical jumper 270 is shown. As seen in FIG. 2, an external fiber cable 210 terminates at the external optical cable connector 260 on the side of the faceplate 205 that is external to the module. The pluggable optical transceiver module 200 in FIG. 2 particularly employs a single-level rigid-plane optical jumper 270 as a rigid-plane interface between the external optical cable 210 (via the external optical cable connector 260) and an optical socket 230. The single-level rigid-plane optical jumper 270 comprises a rigid-plane, shown as an elongated plane (e.g., greater in length, than in thickness), having waveguides integrated therein. The waveguides in the body of the single-level rigid-plane optical jumper 270 can be implemented using various forms of waveguides, such as hollow-metal waveguides (HMWG) 271 within plastic plates, or a 3D-laser written waveguides in a glass plate, referred as a glass waveguide (GWG). In a GWG embodiment, the waveguides are formed in any number of layers (within a limit) in a glass plate. Also, it is possible for multiple glass plates to be stacked, but waveguides cannot transition from one plate to another. In yet another embodiment, the HMWG 271 can be formed with 45° mirrors to turn the optical signals left/right and up/down to rearrange the optical signals before the HMWG 271 terminates at the faceplate 205. In this case, the HMWGs need to be precisely aligned to the external optical cable connector 260. Mechanical alignment features such as pillars and complementary holes can be incorporated in the plastic plate 272 to enable precise alignment.

The single-level rigid-plane optical jumper 270 also comprises a cable connector interface portion on a proximal end (proximate to the external optical cable connector 260) and an optical socket interface portion on a distal end (proximate to the optical socket 230). The cable connector interface portion of the single-level rigid-plane optical jumper 270 can include a ferrule adapter 265, and alignment/retention features for opto-mechanically coupling the external optical cable connector 260 (and the external cable fiber 210 terminated thereto) to the waveguides. The optical socket interface portion of the single-level rigid-plane optical jumper 270 can include a CWDM block 240 and alignment/mating features to opto-mechanically couple to the optical socket 230.

As referred to herein, the term "single level" refers to a structure having a single rigid-plane (in the horizontal plane) that can be used to propagate both transmit (Tx) signals and receive (Rx) signals for the opto-electronics of the CWDM optical transceiver 250. As will be described in detail in reference to other figures, for example FIG. 3, there are other embodiments of the rigid-plane optical jumper that can comprise multiple levels. According to the embodiments, the CWDM block 240 can have integrated micro-optics, such as mirrors, lenses, optical multiplexer/demultiplexer, and wavelength filters as described above (in reference to the chip optical connector in FIG. 1B).

In the illustrated example, the single-level rigid-plane optical jumper 270 is implemented as a HMWG 271. The HMWG 271 is shown as being formed within a plastic plate 272. For example, channels in an injection molded plastic plate 272 can be coated with high reflectivity thin films such as gold (including an adhesion layer such as Ti or Cr between the gold film and plastic surface) to form the HMWG 271. In another example, a stamped metal shim with metal cover piece (or plastic shim) electroplated with a high reflectivity material such as gold, is affixed on top of plastic plate 272 with channels to form the HMWG 271. In an embodiment, the single-level rigid-plane optical jumper 270 can be implemented as a HMWG assembly that consists of multiple stacked HMWG layers, or plates. However, waveguides cannot transition from one plate to another. FIG. 2 illustrates that the HMWG 271 can start at an end face (e.g., interface with external optical cable connector 260 within the ferrule adapter 265) of the cable connector interface portion the single-level rigid-plane optical jumper 270, and ends at the CWDM block 240 in the optical socket interface portion of the single-level rigid-plane optical jumper 270.

Thus, in operation, the HMWG 271 feeds light from the external fiber cable 210 into the zig-zag multiplexer/demultiplexer 241 of the CWDM block 240 which is connected to optical socket 230. In order to support this functionality, the zig-zag multiplexer/demultiplexer 241 of the CWDM block 240 can incorporate additional features, such as an HMWG entrance window and relay mirrors (not shown). Once the CWDM block 240 is connected to the optical socket 230, the opto-electronics of the CWDM optical transceiver 250 are aligned such that the optical transceiver can transmit and receive optical signals via the external fiber cable 210. As referred to herein, the term "rigid-plane" refers to the planar array of transmit or receive optical signals paths of CWDM block 240 being rigidly connected to the distal end of the single-level rigid-plane optical jumper 270 (having a single and rigid interface point between the waveguide array of optical jumper and the CWDM block). Although FIG. 2 shows the CWDM block 240 as being at the distal end of the rigid-plane 270, there are other embodiments disclosed herein that allow the CWDM block to be embedded within a rigid-plane or affixed on top of the rigid-plane. Further, one or multiple rigid-planes can interface to a single CWDM block, as will be disclosed herein.

Additionally, as seen in FIG. 2, the cable connector interface portion of the single-level rigid-plane optical jumper 270 can include the ferrule adapter 265, which serves as a supporting structure for stably supporting and retaining the single-level rigid-plane optical jumper 270 on the faceplate 205. In an embodiment, the external optical cable connector 260 may be retrofitted with the ferrule adapter 265. The ferrule adapter 265 can be mounted on the faceplate 205 and can include various retention features for stably supporting and retaining the single-level rigid-plane optical jumper 270. The ferrule adapter 265 can also include complementary mating features to align the HMWG 271 to the end face of the external optical cable connector 260. Accordingly, the ferrule adapter 265 is configured to opto-mechanically couple the HMWG 271 within the body of the single-level rigid-plane optical jumper 270 to the external optical cable connector 260.

In the illustrated example, the ferrule adapter 265 is also configured with a mode matching lens 274 for mode matching with the zig-zag multiplexer/demultiplexer elements of the micro-optics in the CWDM block 240. The mode matching lens 274 interfaces with an end of the HMWG 271 (on the cable connector interface side of the single-level rigid-plane optical jumper 270). Alternatively, the mode matching lens 274 may be integrated with the HMWG 271. In some embodiments, the ferrule adapter 265 can include a mechanism, such as a "flap" to prevent dust from entering the HMWG 271 when the external optical cable connector 260 is not inserted.

In some embodiments, the pluggable optical transceiver module 200 has the single-level rigid-plane optical jumper 270 pre-assembled (already connected) before being deployed (e.g., at the factory, during manufacture). Pre-assembly provides an ease of use, which does not require that an installer have familiarity with the HMWG 271 and its proper installation.

Figure 3A:
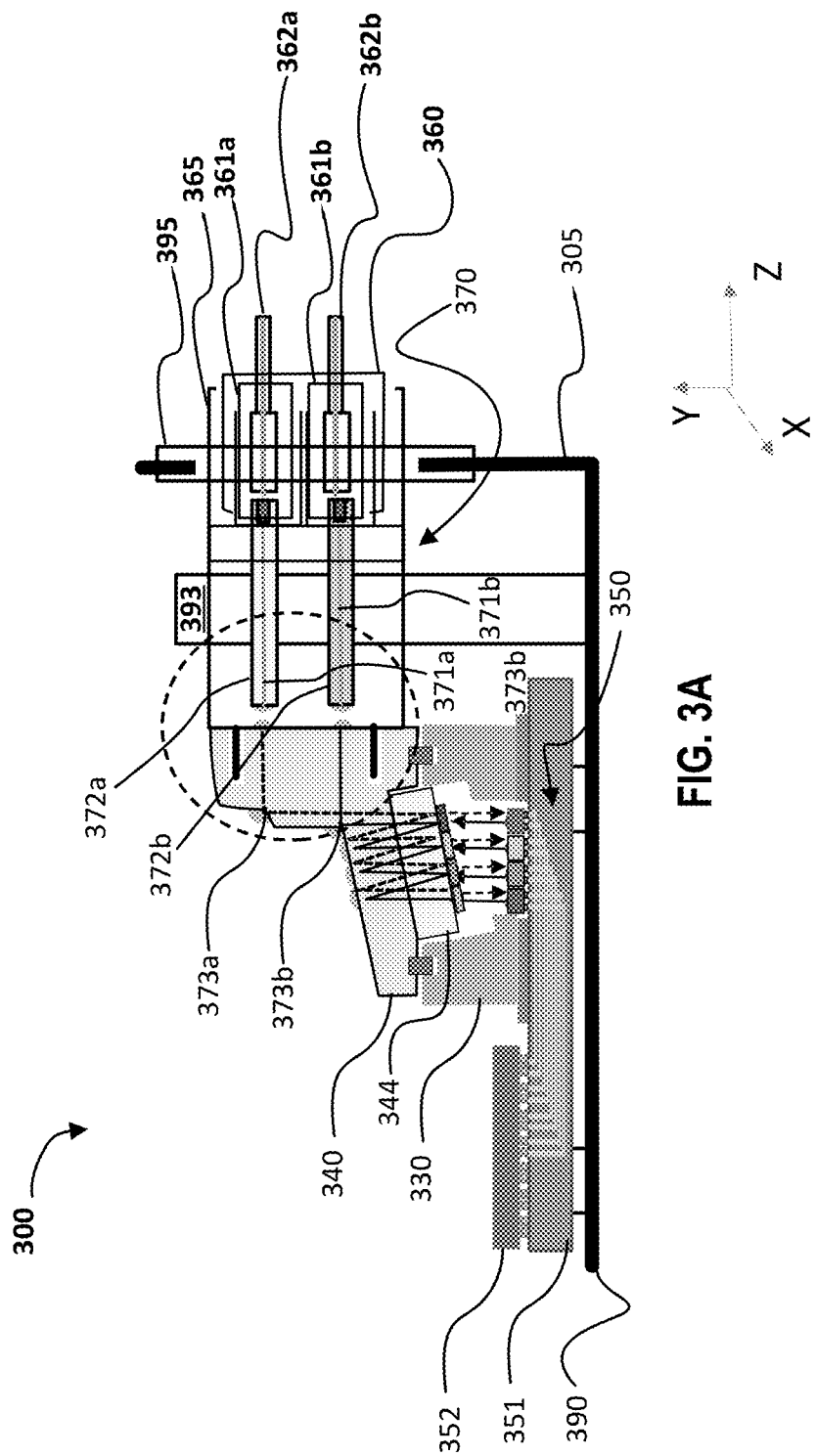
FIG. 3A illustrates another example of a pluggable optical transceiver module including another example configuration for a rigid-plane optical jumper, including a multi-level rigid-plane optical jumper for an opto-mechanical connection to an optical socket, in accordance with an embodiment of the technology disclosed herein.

In FIG. 3A, a pluggable optical transceiver module 300 incorporating another example of a multi-level rigid-plane optical jumper 370 is depicted. The multi-level rigid-plane optical jumper 370 is considered multi-level, because the jumper 370 includes an upper rigid-plane 372a positioned in a first upper plane (with respect to the Y-axis) and a lower rigid-plane 372b positioned in a second lower plane (with respect to the Y-axis). For example, the rigid-planes 372a and 372b can be two HWMG plates positioned parallel to each other (horizontally). Each rigid-plane 372a, 372b serves as an opto-mechanical interface between the ferrule adapter 365 and the CWDM block 340. The ferrule adapter 365 can be implemented as a duplex ferrule connector receptacle to accept a duplex external optical cable connector 360 that houses two individual simplex ferrules 361a, 361b. The duplex external optical cable connector 360 can be vertically arranged such that simplex ferrules 361a, 361b are vertically aligned on top of each other (column) within the duplex external optical cable connector 360 and straddling across the two rigid-planes 372a, 372b. As seen in FIG. 3A, the simplex ferrule 361a is arranged in the upper plane and aligned such that it can be coupled to the rigid-plane 372a. Simplex ferrule 361b is arranged in the lower plane and aligned such that it can be coupled to the rigid-plane 372b. The simplex ferrules 361a, 361b in the duplex external optical cable connector 360 has enough 3D mechanical float to self-align to each corresponding waveguide position of the rigid-planes 372a, 372b.

Further, an optical fiber for propagating transmit signals (Tx), or Tx fiber 362a, may be terminated with the simplex ferrule 361a and an optical fiber for propagating receive signals (Rx), or Rx fiber 362b, may be terminated with the simplex ferrule 361b. Accordingly, each rigid-plane 372a, 372b of the multi-level rigid-plane optical jumper 370 supports a distinct waveguide path in the duplex communication. That is, the upper rigid-plane 372a propagates Tx signals to the Tx fiber 362a along its waveguide 371a, and the lower rigid-plane 372b propagates Rx signals from the Rx fiber 362b along its waveguide 371b.

Figure 3B:
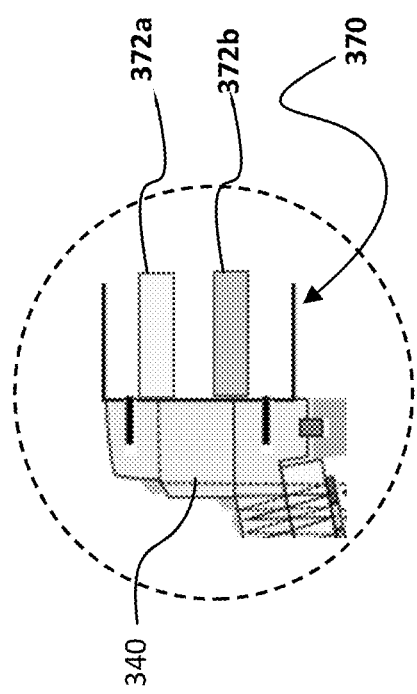
FIG. 3B illustrates a close up view of the rigid-plane optical jumper shown in FIG. 3A coupling to the CWDM block, in accordance with an embodiment of the technology disclosed herein.
Figure 3C:
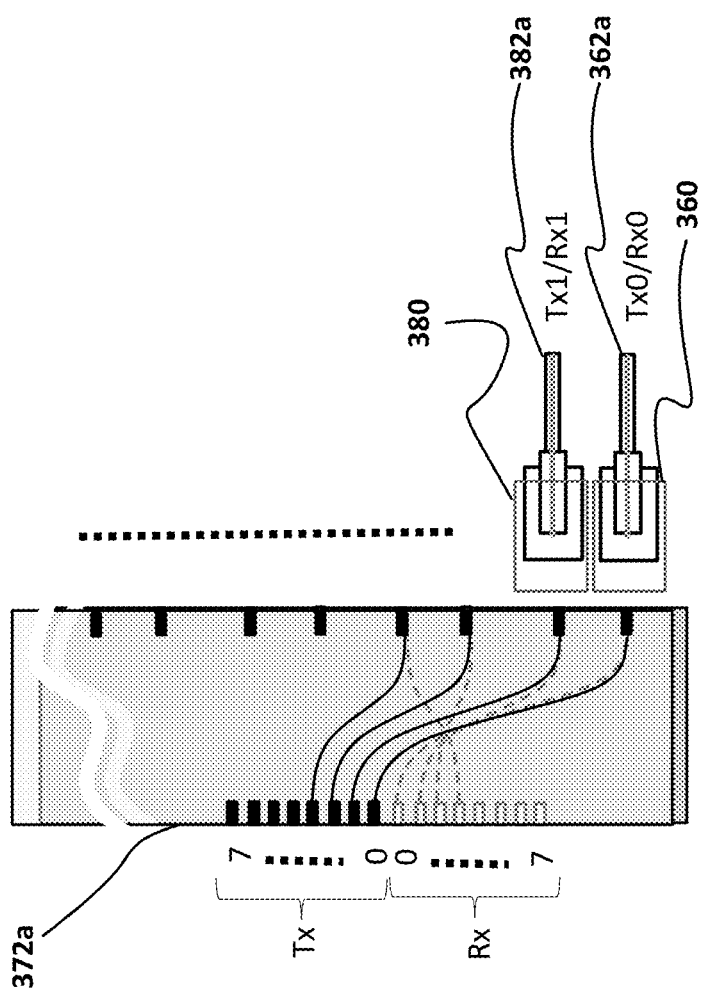
FIG. 3C illustrates a top view of the rigid-plane optical jumper, including a multi-level rigid-plane optical jumper for an opto-mechanical connection to an optical socket shown in FIG. 3A, in accordance with an embodiment of the technology disclosed herein.

The top view in FIG. 3C illustrates that another duplex external optical cable connector 380 having a Tx fiber 382a terminated to it can also be coupled to the rigid-plane 372a. For instance, the duplex external optical cable connector 380 is positioned next to duplex external optical cable connector 360 along the horizontal length (X-axis) of the rigid-plane 372a. Accordingly, the duplex external optical cable connector 360 supports signals Tx0, Rx0 via Tx fiber 362a and Rx fiber 362b respectively. Similarly, external optical cable connector 380 supports signals Tx1, Rx1 via Tx fiber 382a and a Rx fiber (not shown).

FIG. 3A also shows a ferrule adapter 365 that can include a mechanical support 395. The mechanical support 395 can have retention features to stably attach rigid-planes 372a, 372b and alignment features to accept simplex ferrules 361a, 361b of the external optical cable connector 360. Therefore, when the ferrule adapter 365 is interfaced with the mechanical support 395, the individual simplex ferrules 361a, 361b (each having an individual fiber 362a, 362b terminated on one end) interfaces to its respective rigid-planes 372a, 372b. Restated, simplex ferrule 361a interfaces with upper rigid-plane 372a and simplex ferrule 361b interfaces with lower rigid-plane 372b. Since the rigid-planes 271a, 271b are fixed rigid bodies, the individual simplex ferrules 361a, 361b need to comply with the necessary alignment features within the mechanical support 395 in order to adapt to the tolerance differences between the upper rigid-plane 372a and the lower rigid-plane 372b. Additionally, a mechanical support structure 393 for rigid-plane optical jumper 370 can be affixed to chassis base pan 390 of the module 300 for providing mechanical support (e.g., in mechanical stress in multiple axis, tolerances, etc.). Alternatively, a mechanical support structure 393 for rigid-plane optical jumper 370 can be affixed to the transceiver board 351 of the module 300 for providing mechanical support.

FIG. 3B shows a close up view of the CWDM block 340 attached to the multi-level rigid-plane optical jumper 370, which is generally short and also functions as a duplex connector receptacle. Optical signal is said to be in a rigid-plane between the rigid coupling of the CWDM block 340 and the rigid-body optical jumper 370. The interface between the rigid-plane optical jumper 370 and CWDM block 340 can be butt-couple type (for HMWG and GWG) or air-gap with lens type to mode match optical signals. For example, there can be butt-coupling between the WG and the chip ferrule of the CWDM block 340.

Referring back to FIG. 3A, as an example, in operation, the upper rigid-plane 372a can support waveguide paths particularly for transmit (TX) signals. Alternatively, the lower rigid-plane 372b can support waveguide paths particularly for receive (RX) signals. Therefore, Tx signals propagate on an individual waveguide, namely the waveguide 371a, while the Rx signals propagate on a separate waveguide, namely waveguide 371b. FIG. 3A also illustrates that the optical signal paths for Tx and Rx signals are offset, as result of the different waveguides. For example, the Tx signals on upper rigid-plane 372a are offset such that these signals correspond to a level 373a including VCSELs of the opto-electronics of the optical transceiver 350, and the Rx signals on lower rigid-plane 372b are offset such that these signals correspond to a level 373b including PDs of the opto-electronics of the optical transceiver 350. In other words, the optical signals from VCSELs and PDs after the mux/demux 344 are offset in different planes 373a and 373b. This is an important concept in the design of the jumper 370, where the two signal planes within the CWDM block 340 need to be offset to interface to the rigid-planes 372a and 372b.

Figure 4A:
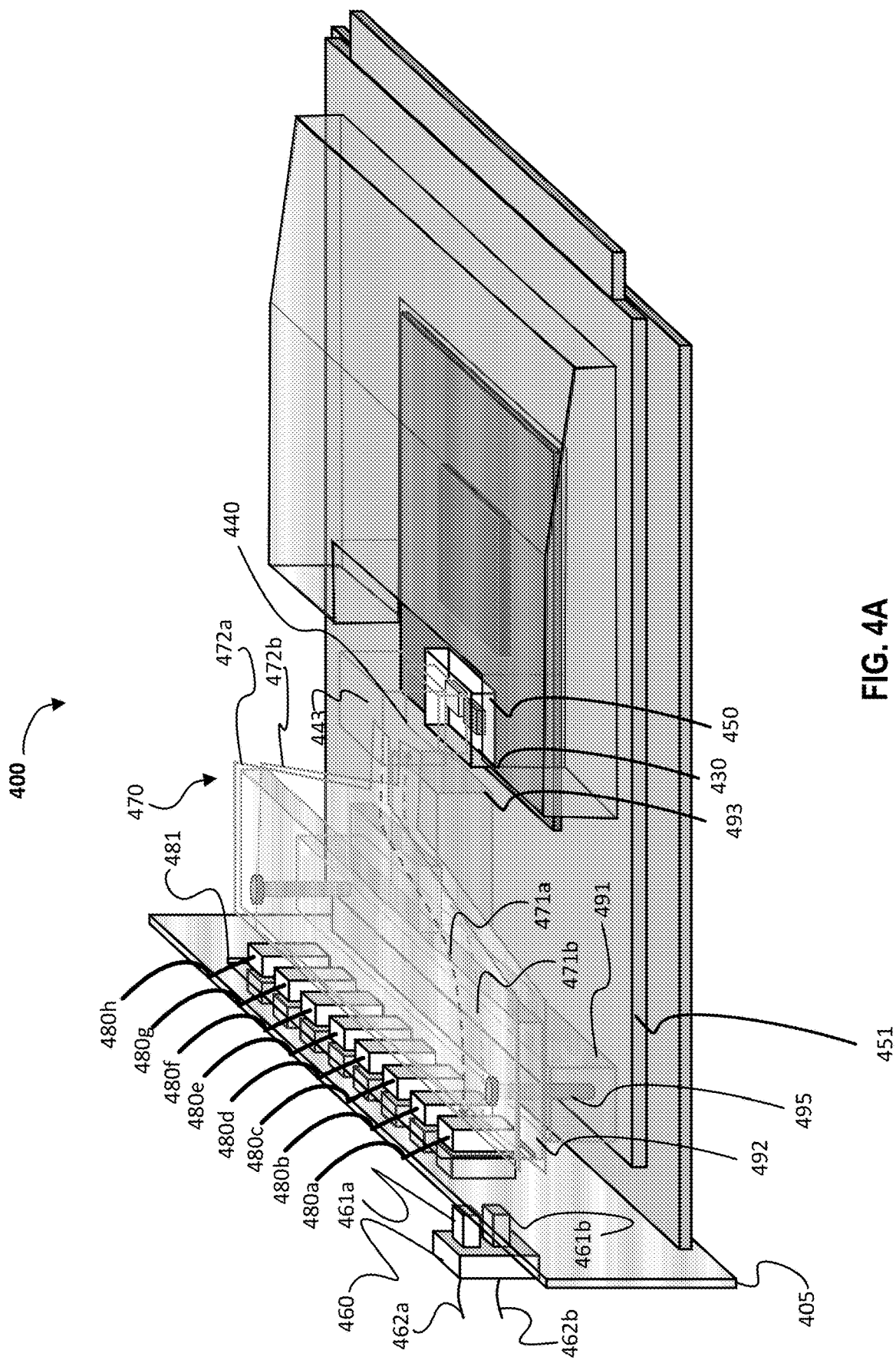
FIG. 4A illustrates another example of a pluggable optical transceiver module including yet another example configuration for a rigid-plane optical jumper, including a multi-plane single-layer rigid-plane optical jumper for an opto-mechanical connection to an optical socket, in accordance with an embodiment of the technology disclosed herein.

FIG. 4A shows a pluggable optical transceiver module 400 incorporating another example of a rigid-body optical jumper 470. In the illustrated example of FIG. 4A, the rigid-body optical jumper is implemented as a multi-plane single-layer rigid-body optical jumper 470. As shown, the multi-plane single-layer rigid-body optical jumper 470 is primarily structured as two waveguide plates 472a and 472b. Waveguide plate 472a comprises an array of waveguides where only one waveguide 471a is shown. Similarly, waveguide plate 472b comprises another array of waveguides where only one waveguide 471b is shown. The multi-plane single-layer rigid-plane optical jumper 470 is considered multi-plane, because the rigid-plane optical jumper 470 includes a waveguide plate 472a with waveguide 471a positioned in a first (upper) plane (with respect to the Y-axis) and a waveguide plate 472b with waveguide 471b positioned in a second (lower) plane (with respect to the Y-axis). Each waveguide plate 472a, 472b serves as an opto-mechanical interface between an external optical cable connector 460 and the CWDM block 440. Additionally, the multi-plane single-layer rigid-body optical jumper 470 includes several ferrule adapters 480a-480h that are installed on the proximal end (e.g., cable connector interface portion) of the rigid-plane optical jumper 470. The ferrule adapters 480a-480h can be secured on a sub-panel 481. Sub-panel 481 allows ferrule adapters 480a-480h to be a part of the rigid-plane optical jumper 470 that can be mounted on the faceplate 405. Sub-panel 481 also provides external cable pull-force isolation. An external optical cable connector 460 may be a duplex ferrule connector, housing two individual simplex ferrules 461a, 461b. The external optical cable connector 460 can be vertically arranged such that it straddle's across both planes, in order for simplex ferrules 461a, 461b to interface with waveguides 471a, 471b of waveguide plates 472a, 472b. For example, simplex ferrule 461a can interface with upper waveguide 471a of waveguide plate 472a, and simplex ferrule 461b can interface with lower waveguide 461b of waveguide plate 472b. Each of the waveguides 471a, 471b of the multi-plane single-layer rigid-body optical jumper 470 supports a distinct optical signal path in the duplex communication. That is, the upper waveguide 471a is shown to propagate Tx signals (indicated by dashed left arrow) and lower waveguide 471b propagates Rx signals (indicated by dashed right arrow).

Figure 4B:
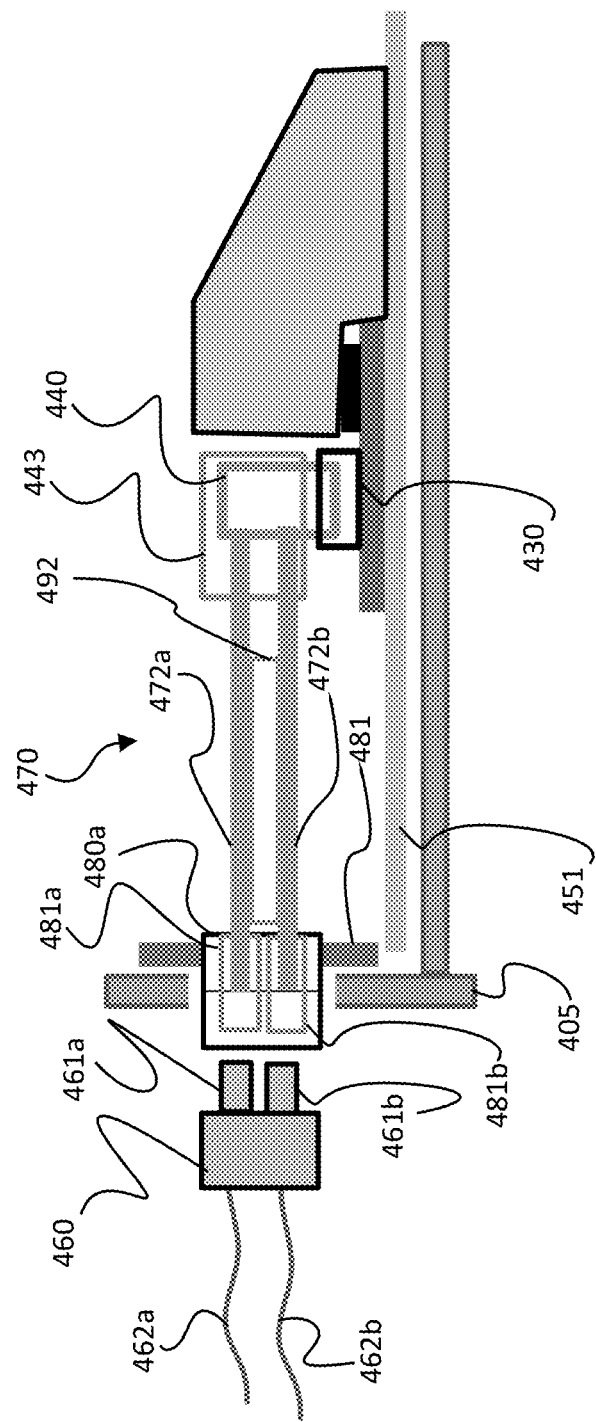
FIG. 4B illustrates a side view of the multi-plane single-layer rigid-plane optical jumper shown in FIG. 4A, in accordance with an embodiment of the technology disclosed herein.

The side view in FIG. 4B more prominently illustrates that the external optical cable connector 460, implemented as a duplex ferrule connector, straddles across both waveguide plates 472a, 472b of the multi-plane single-layer rigid-body optical jumper 470. Thus, when the external optical cable connector 460 is coupled to the ferrule adapter 480a of the rigid-plane optical jumper 470, then simplex ferrules 461a, 461b are opto-mechanically coupled to waveguide plates 472a, 472b, respectively. Each of the ferrule adapters 480 may be individually mounted to straddle waveguide plates 472a, 472b, where opto-mechanical alignment features 465a, 465b receive the simplex ferrules 461a, 461b of the external optical cable connector 460. Each of the ferrule adapters 480 may be permanently mounted to waveguide plates 472a, 472b on one side while having integrated mechanical features 481 to stably retain an external optical cable connector 460 on the opposite side of faceplate 405.

Referring back to FIG. 4A, the multi-plane single-layer rigid-plane optical jumper 470 is shown to include multiple structural supports 491, 492, and 493. The structural support 491 can be a spacer to stably support the lower waveguide plate 472b at its height from the transceiver board 451 to the lower plane (aligned with the ferrule 461b). The structural support 492 can be a spacer that stably supports the upper waveguide plate 472a at its height from the lower waveguide plate 472b to the upper plane (aligned with the ferrule 461a) and controls tolerances. The structural support 493 can be a spacer that stably supports the jumper 470 at its distal end near the CWDM block 440. Structural supports 491, 492 and 493 may be constructed of a material that has matching coefficient of thermal expansion (CTE) with the waveguide plates 472a, 472b. There may be gasket or washer components between these structural supports and waveguide plates 472a, 472b to address coplanar variations at the contact points. A retention mechanism such as mounting screws 495 and/or epoxy may be used to stably secure waveguide plates 472a, 472b in order for the rigid-plane optical jumper 470 to be in position with respect to optical socket 430 and faceplate 405.

At the CWDM block 440, the multi-plane single-layer rigid-plane optical jumper 470 can have multiple interface points to the CWDM block 440. For instance, upper waveguide plate 472a can have an individual interface point to CWDM block 440, while lower waveguide plate 472b has a different individual interface point that is staggered (lower) from the individual interface point of waveguide plate 472a. Accordingly, each waveguide plate 472a, 472b of the multi-plane single-layer rigid-plane optical jumper 470 serves as an opto-mechanical interface between the external optical connector 460 and the CWDM block 440. Further, the CWDM block 440 is opto-mechanically coupled to the optical socket 430. Accordingly, coupling the multi-plane single-layer rigid-plane optical jumper 470 to the optical socket 430 forms an opto-mechanical interface between an external optical cable and the optical socket 430 in a manner that enables the opto-electronics of the optical transceiver 450 to transmit and receive optical signals via the external fiber cable.

FIG. 4C illustrates another example of a multi-plane single-layer rigid-plane optical jumper 470 that includes a CWDM block 440 directly attached thereto within the chip ferrule housing 443. As seen, the CWDM block 440 can be attached to the distal end (e.g., optical socket interface portion) of both of the multiple rigid waveguide plates 472a, 472b of the multi-plane single-layer rigid-plane optical jumper 470. The chip ferrule housing 443 can include receptacles 446a, 446b that are configured for receiving the ends of the multiple waveguide plates 472a, 472b, respectively. The waveguide plates 472a, 472b are installed in the receptacles 446a, 446b such that their respective waveguides 471a, 471b are coupled to the CWDM block 440 within the chip ferrule housing 443. When installed, the multi-plane single-layer rigid-plane optical jumper 470 can be pushed in a direction towards the CWDM block 440. By aligning the multiple rigid waveguide plates 472a, 472b with the receptacles 446a, 446b, the upper waveguide plate 472a can be inserted into the receptacle 446a and the lower waveguide plate 472b can be inserted into the receptacle 446b during the jumpers 470's continued movement towards the CWDM block 440 (indicated by dashed right arrows). The spacer 492 can maintain a proper distance between the rigid waveguide plates 472a, 472b to allow for proper alignment with the CWDM block 440, and for being received by the receptacles 446a, 446b. The receptacles can act as mechanical supports to stably support and hold the rigid waveguide plates 472a, 472b into their installed positions. There may be retention features between waveguide plates 472a, 472b and CWDM block 440, such as epoxy and locking pins (not shown) to securely retain waveguide plates 472a, 472b to CWDM block 440 within the chip ferrule housing 443. After the rigid waveguide plates 472a, 472b have been inserted into the receptacles 446a, 446b, the CWDM block 440 is mechanically coupled to the distal end of the jumper 470. After being coupled to the end of the jumper 470, the chip ferrule housing 443 encasing the CWDM block 440 can be pushed downward (indicated by the dashed down arrow) to be seated to the optical socket 430.

FIG. 4D shows an example of the multi-plane single-layer rigid-plane optical jumper 470 fully coupled to the CWDM block 440 within the chip ferrule housing 443, and the chip ferrule housing 443 being coupled to the optical socket 430. In this position, the CWDM block is opto-mechanically coupled to the optical socket 430 in a manner that allows the opto-electronics of the optical transceiver 450 to be optically aligned to the micro-optics of the CWDM block 440. In turn, the installation appropriately positions the waveguides 471a, 471b in their respective rigid waveguide plates 472a, 472b to be optically aligned for propagating optical signals to and from the optical transceiver 450. As alluded to above, with multiple rigid waveguides in different planes, one plane is to couple to the VCSELs of the opto-electronics for propagation of Tx signals, and the other plane is to couple to the photodetectors of the opto-electronics for propagation of Rx signals. For example, FIG. 4D shows that the upper waveguide 471a in the upper rigid waveguide plate 472a is aligned with the upper turning lenses 442a and the upper relay mirrors 441a to eventually couple the Rx signals (shown with solid-line optical signal path) through the wavelength filter block 443 to the PD arrays (not shown), and the lower waveguide 471b in the lower rigid waveguide plate 472b is aligned with the lower turning lenses 442b and the lower relay mirrors 441b to eventually receive Tx signals (shown with dashed-line optical signal path) from the VCSEL arrays 431 through the CWDM wavelength filter block 443. In other words, the different planes of the rigid waveguide plates 472a, 472b allows the signals to interface with the turning lenses 442a, 442b and the relay mirrors 441a, 441b within the CWDM block 440 at different elevation layers. Accordingly, the multi-plane single-layer rigid-plane optical jumper 470 forms an opto-mechanical interface with the optical socket 430 that enables the opto-electronics of the optical transceiver 450 to transmit and receive optical signals.

FIG. 4E shows yet another example position of the multi-plane single-layer rigid-plane optical jumper 470 including the CWDM block 440 indirectly attached thereto. In the arrangement, a half periscope 435 is used to achieve the indirect coupling of the CWDM block 440 to the distal end of the rigid waveguide plates 472a, 472b. As referred to herein, the half periscope 435 can be described as an optical instrument that can use a system of prisms, lenses or mirrors to deflect lights in one half, and simply let lights pass through straight in the other half, to achieve bidirectional optical signal coupling. For example, rigid waveguide plates 472a, 472b can be physically coupled to the half periscope 435, where lights from the waveguide 471b of waveguide plate 472b can pass straight through the half periscope 435 to be received by the CWDM block 440, and lights from the CWDM block 440 can deflect within the half periscope 435 to waveguide 471a of waveguide plate 472a, to achieve bi-directional optical coupling through rigid-plane optical jumper 470. In the half periscope 435, half does not have prisms for receiving light, which allows the light to go straight from the lower waveguide 471b in the lower rigid waveguide plate 472b to the zig-zag multiplexer/demultiplexer 444. FIG. 4F shows an example of the multi-plane single-layer rigid-plane optical jumper 470 in which the periscope 435 has a half that includes prisms 436 for transmitting light to go from the zig-zag multiplexer/demultiplexer 444 to the upper waveguides 471a in the upper rigid waveguide plate 472a. That is, the periscope 435 is primarily applied for the Tx signals that propagate through the waveguide 471a in the rigid waveguide plate 472a, in this example.

FIG. 4G illustrates a top view of an example of a rigid waveguide assembly 475 that can be used to construct a single-layer rigid-plane optical jumper 470. The waveguide assembly 475 can include two sets of waveguides. First set of the waveguides of the assembly 475, namely the upper waveguides 471a in the upper waveguide plate 472a for Tx signals, interfaces to a periscope 435 with a prism 436. Second set of the waveguides of the assembly 475, namely the lower waveguides 471b in the upper waveguide plate 472b for Rx signals, interfaces to a periscope 435 (without a prism 436).

Figure 5A:
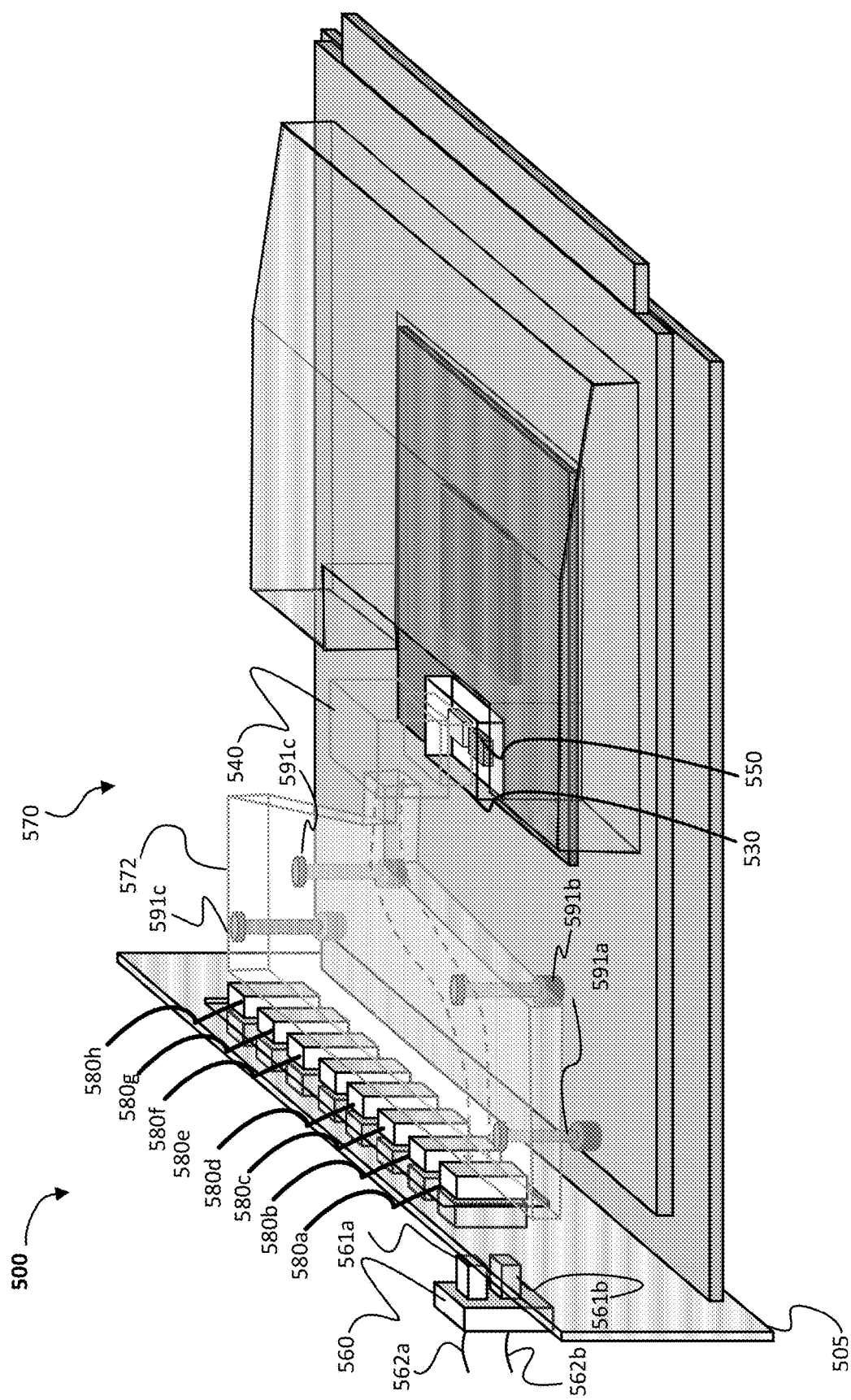
FIG. 5A illustrates another example of a pluggable optical transceiver module including yet another example configuration for a rigid-plane optical jumper, including a single-plane multi-layer rigid-plane optical jumper for an opto-mechanical connection to an optical socket, in accordance with an embodiment of the technology disclosed herein.

Referring now to FIG. 5A, shows a pluggable optical transceiver module 500 incorporating another example of a rigid-plane optical jumper 570. In the illustrated example of FIG. 5A, the rigid-plane optical jumper is implemented as a single-plane multi-layer rigid-plane optical jumper 570. The single-plane multi-layer rigid-plane optical jumper 570 can be implemented to comprise a waveguide block 572 with waveguides formed on both sides (of each plane). That is, the body of the multi-layer rigid-plane optical jumper 570 is structured as monolithic solid block, having a volume thickness that can cover multiple planes (as opposed to thin waveguide plates having a thickness that covers a single plane shown in FIG. 4A for example). For example, faceplate of the waveguide block 572 has a thick volume that allows both ferrules of the duplex external optical cable connector 560 arranged in a vertical orientation to interface within the height of the waveguide block 572. Also, in the case where the external optical cable connector 560 is oriented 90° in a horizontal ferrule arrangement (not shown), both simplex ferrules of the duplex external optical cable connector 560 in side-by-side horizontal array formation would still be able to interface within the volume of the waveguide block 572. However, with the horizontal connector array arrangement, the Tx signals and the Rx signals would traverse on the same plane level (as opposed to an upper plane for Tx signals and a lower plane for Rx signals shown in FIG. 4A). Elements and functionality that are similar to the module and rigid-plane optical jumper described in FIG. 4A are not described again in detail in reference to FIG. 5A for purposes of brevity. The single-plane multi-layer rigid-plane optical jumper 570 mechanically couples to the external optical cable connector 560 at the faceplate via a ferrule adapter 580a. Further, the single-plane multi-layer rigid-plane optical jumper 570 couples to the CWDM block 540. The CWDM block 540, in turn, couples to the optical socket 530 which enables an opto-mechanical coupling of the micro-optics in the CWDM block 540 and the opto-electronics of the optical transceiver 550. At its distal end, the single-plane multi-layer rigid-plane optical jumper 570 has a single physical interface coupling the waveguide block 572 to the CWDM block 540. This single interface between the waveguide block 572 and the CWDM block 540 can be described as the single-plane feature of the jumper 570. In one example, a waveguide block 572 may be constructed by forming HMWG on a plastic block. In another example, a waveguide block 572 may be constructed by laser writing waveguides within a glass block.

Additionally, FIG. 5A shows that the module 500 can include structural supports 591a-591c for supporting and stably holding the single-plane multi-layer rigid-plane optical jumper 570 in position. The structural supports 591a-591c can be attached to the transceiver board, and affixed to the waveguide block 572 at various positions around is perimeter to serve as a stabilizing base for the jumper 570. The structural supports 591a-591c may be implemented as mechanical stand-offs, magnetic locks, and the like.

Figure 5B:
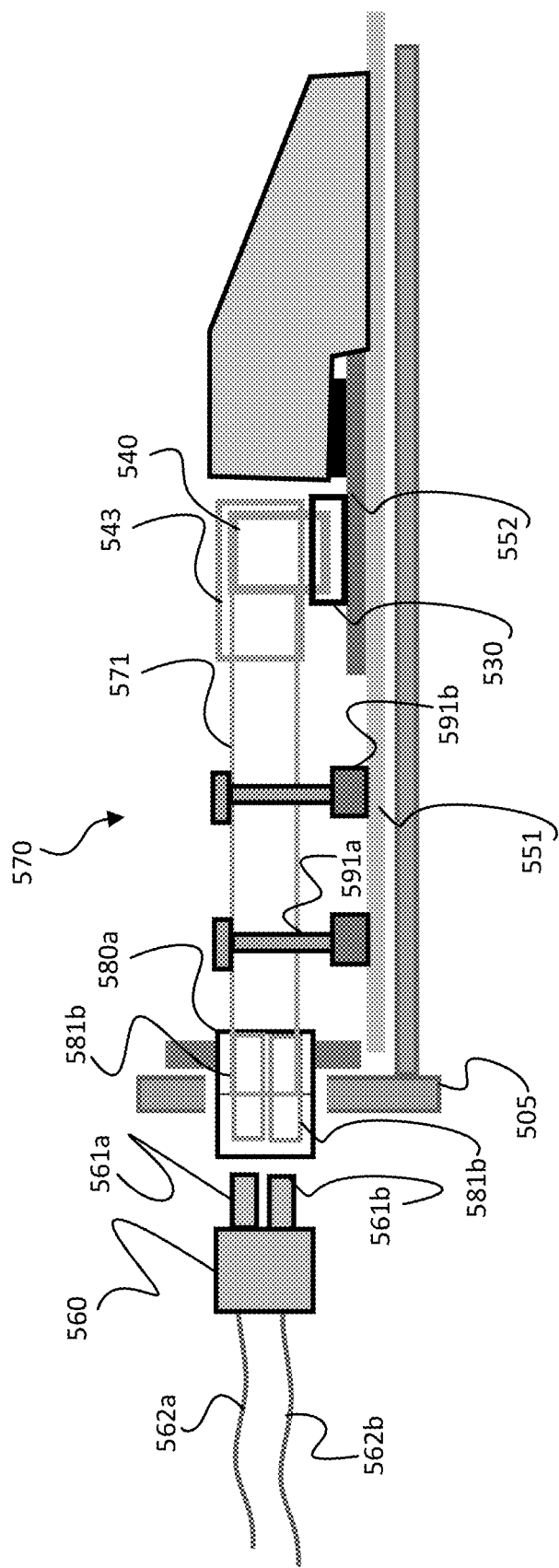
FIG. 5B illustrates a side view of the single-plane multi-layer rigid-plane optical jumper shown in FIG. 5A, in accordance with an embodiment of the technology disclosed herein.

The side view of the module 500 in FIG. 5B more prominently illustrates that the external optical cable connector 560, implemented as a duplex ferrule connector vertically oriented, allows both ferrules to interface within the volume of the waveguide block 572. Thus, when the external optical cable connector 560 is coupled to the ferrule adapter 580a of the jumper 570, then simplex ferrules 561a, 561b are opto-mechanically coupled to the waveguide block 572. The ferrule adapter 580 can be individually mounted, and includes integrated mechanical features 581a, 581b to align its apertures to receive the ferrules of the external optical cable connector 560.

Figure 5C:
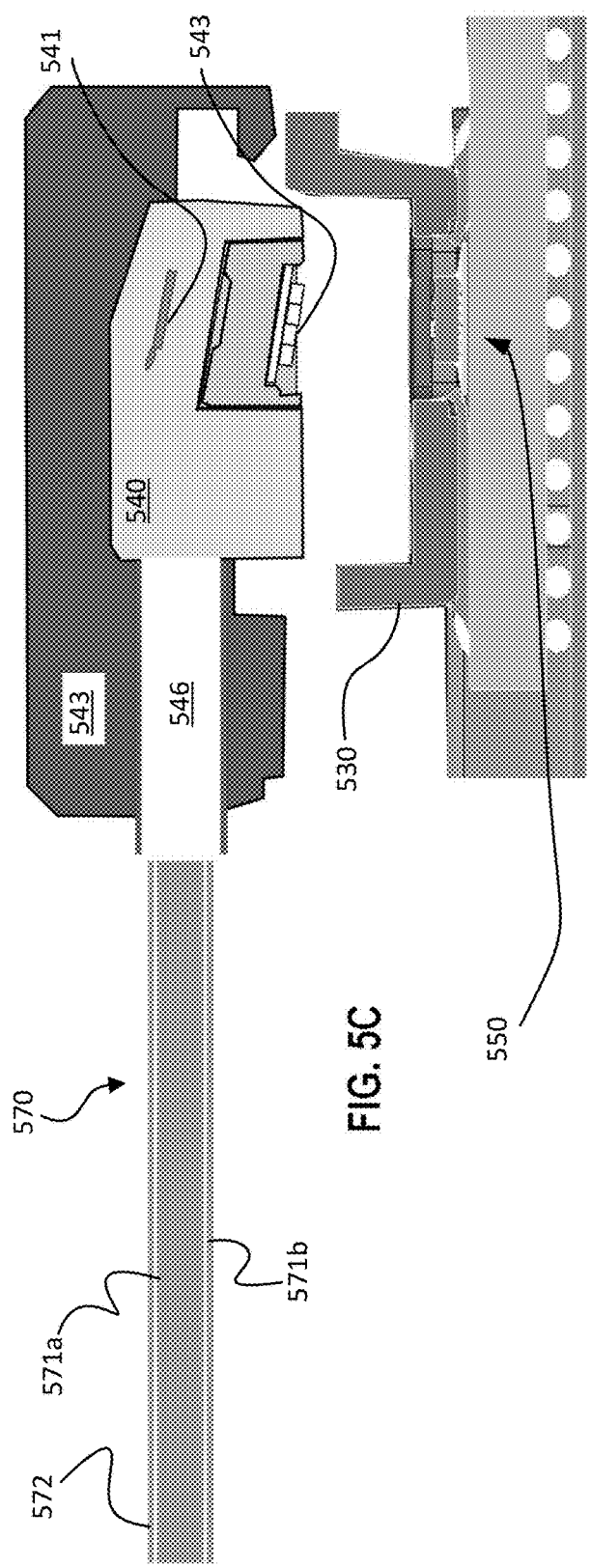
FIG. 5C illustrates another example of a single-plane multi-layer rigid-plane optical jumper including a CWDM block directly attached thereto and an example position for the CWDM block with respect to coupling with an optical socket, in accordance with an embodiment of the technology disclosed herein.

Referring now to FIG. 5C illustrates another example of the single-plane multi-layer rigid-plane optical jumper 570 that includes the CWDM block 540 directly attached thereto. As seen, the CWDM block 540 within the chip ferrule housing 543 can be attached to the distal end (e.g., optical socket interface portion) of the waveguide block 572 of the single-plane multi-layer rigid-plane optical jumper 570. The CWDM block 540 can include a receptacle 546 that is configured for receiving the end of the waveguide block 572. During installation, the single-plane multi-layer rigid-plane optical jumper 570 can be pushed towards the CWDM block 540 within the chip ferrule housing 543. The waveguide block 572 is aligned with the receptacle 546 such that the waveguides 571a, 571b of waveguide block 572 can be properly aligned with the corresponding micro-optics of the CWDM block 540. FIG. 5C shows that the receptacle 546 has dimensions to receive the entire end of the monolithic waveguide block 572 as single piece. In FIG. 5C, a protruding portion of the waveguide block 572, where the protrusion forms a narrow tip at the distal end of the waveguide block 572 is depicted. This "tip" at the end of the waveguide block 572 can be a portion of the jumper 570 that couples directly with the CWDM block 540. There may be retention features (not shown) between waveguide block 572 and CWDM block 540, such as epoxy and locking pins to securely retain waveguide block 572 to CWDM block 540 within chip ferrule housing 543. After inserting the waveguide block 572 into the receptacle 546, the CWDM block 540 is mechanically coupled to the distal end of the jumper 570. The CWDM block 540 can then be pushed downward (indicated by the dashed down arrow) to be seated to the optical socket 530, as shown in FIG. 5D.

Figure 5D:
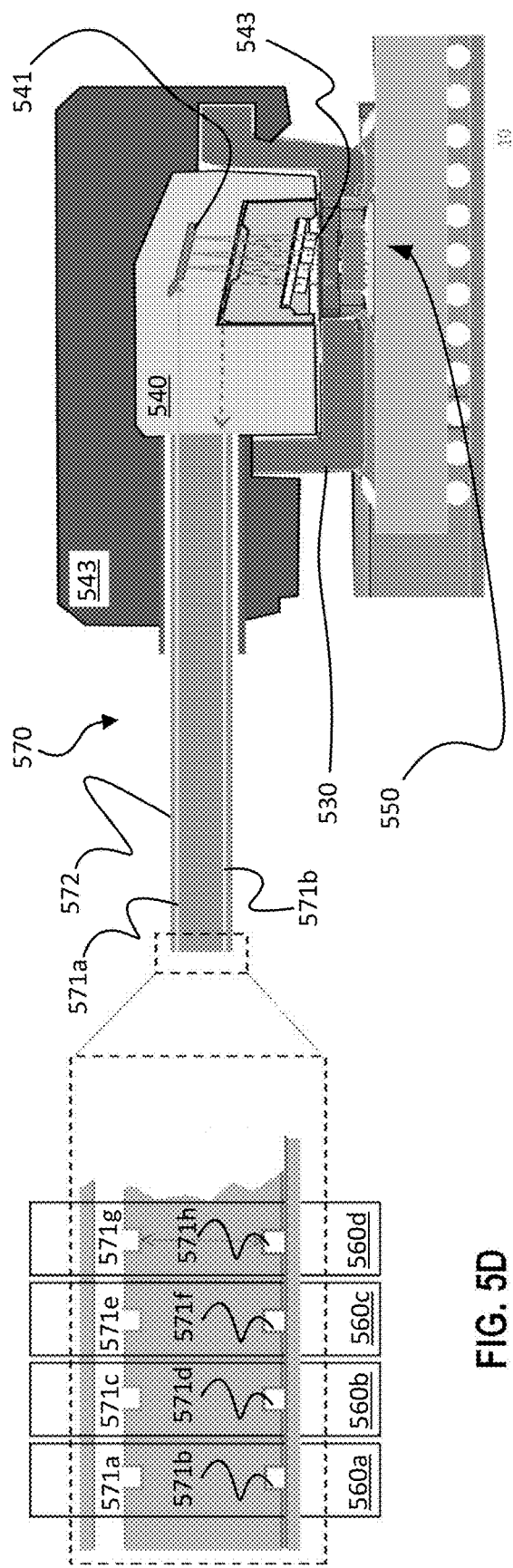
FIG. 5D illustrates a front view of the single-plane multi-layer rigid-plane optical jumper including the CWDM block directly attached thereto shown in FIG. 5C, in accordance with an embodiment of the technology disclosed herein.

FIG. 5D shows an example of the single-plane multi-layer rigid-plane optical jumper 570 fully coupled to the CWDM block 540, and the CWDM block 540 being coupled to the optical socket 530. In this position, the CWDM block 540 is opto-mechanically coupled to the optical socket 530 in a manner that allows the opto-electronics of the optical transceiver 550 to be optically aligned to the micro-optics of the CWDM block 540. In turn, the installation appropriately positions the waveguides 571*a*, 571*b* formed within the waveguide block 572 to be optically aligned for propagating optical signals to and from the optical transceiver 550. Consequently, the single-plane multi-layer rigid-plane optical jumper 570 forms an opto-mechanical interface with the optical socket 530 that enables the opto-electronics of the optical transceiver 550 to transmit and receive optical signals.

FIG. 5D also shows a front view of a waveguide block 572 that may be constructed with HMWGs. Multiple external optical cable connectors 560*a*-560*d* can be coupled to the waveguide block 572 at the cable connector interface portion of the jumper 570. Waveguides 571*a*-571*h* may be formed by molding 3-wall channels on each side, apply metal coating, and affixing metalized plate on each side (bottom metalized plate attached, top metalized plate detached). Over-under waveguides, at the top and the bottom of the waveguide block 570, for instance the ends of waveguides 571*a*, 571*b*, are placed apart to be aligned with duplex ferrule pitch within duplex external optical cable connector. Side-by-side waveguides, for instance end of waveguides 571*e*, 571*g* of waveguide block 572 are placed apart for optical cable connector pitch, e.g., the center-line distance between the external optical cable connectors 560*c*, 560*d*.

Referring now to FIG. 6A, yet another example of a pluggable optical transceiver module 600 including a CWDM block 640 (indicated by a dashed line box) embedded within a single-plane single-layer rigid-plane optical jumper 670. For example, the CWDM block 640 can be embedded within the glass plate used to construct the rigid-plane 672. The geometry of the rigid-plane 672 can be particularly structured such that the waveguides 671 (associated with the body of the jumper) and the turning lenses associated with the micro-optics of the CWDM block 640 can be formed within the glass. As seen in FIG. 6A, the rigid-plane 672 can have the waveguides 671 propagating Rx signals, the turning lens 642, and the relay mirrors 641 embedded therein. Further, CWDM filters can be attached at a bottom surface of the rigid-plane 672 (facing the opto-electronics disposed within an optical socket 630) to achieve implementing the zig-zag mux/demux 644 functionality of the CWDM block's 640 micro-optics. The geometry of the rigid-plane 672 is also particularly structured to mate with the optical socket 630. In the illustrated example, the rigid-plane 672 has a protruding portion that extends downward which resembles a chip optical connector (shown in FIG. 1B). This distinct structure of the rigid-plane 672 having the CWDM block 640 embedded within (and in turn the necessary micro-optics) allows the rigid-plane 672 to opto-mechanically couple with the optical socket 630. The distal end of the rigid-plane 672 may have final alignment features 649 that will mate with corresponding alignment features of the optical socket 630 in order for the micro-optics of the CWDM block 640 to properly align with the opto-electronics disposed within the optical socket 630. Thus, by coupling the rigid-plane 672 to the optical socket 630, the micro-optics embedded within the waveguide block are optically aligned with the opto-electronics of the optical transceiver 650.

Additionally, on the cable connector interface portion of the single-plane single-layer rigid-plane optical jumper 670 (proximal to the faceplate 605), the rigid-plane 672 can extend to the faceplate 605 in a manner that allows the rigid-plane 672 to interface directly with a ferrule adapter 680 (having an external cable installed thereto). Thus, in this embodiment, the jumper 670 (including the waveguide 671) can be directly coupled to a ferrule adapter 680 (and the corresponding ferrules) forming an opto-mechanical interface between the external cable and the optical socket 630. FIG. 6A also shows structural support 693 for alignment, retention, and stably holding the rigid-plane 672 in position. Also, the example shows a retention device 696 (e.g., screws) that can be used to further secure the rigid-plane 671 to the structural support 693. These structural support elements can ensure that the jumper 670 remains rigid and prevent any unintended movement.

FIG. 6B is a top view of the single-plane single-layer rigid-plane optical jumper 670. In this illustrated example, the various waveguides 671*a* for Rx signals and the waveguides 671*b* for Tx signals are shown within the rigid-plane 672. Also, FIG. 6B serves to illustrate that these waveguides 671*a*, 671*b* interface with the CWDM elements, namely the turning lenses 642, that are constructed within the rigid-plane 672. As seen, the receive optical signals traverse from receive waveguides 671*a*, deflected by the turning lenses 642, zig-zag between the relay mirrors 641 and filter arrays 644 which selectively allow specific wavelengths to pass through filter arrays 644, and finally coupling to the PD arrays (not shown). Similarly, the transmit optical signals traverse from VCSELs 631 to pass through the filter array 644, zig-zag between the relay mirrors 641 and the filter array 644, deflected by the turning lenses 642, and eventually coupling into transmit waveguides 671*b*.

FIG. 6C and FIG. 6D show another example of the CWDM block 640 embedded within a single-plane single-layer rigid-plane optical jumper 670 described above in reference to FIG. 6A. Generally, FIG. 6C and FIG. 6D show similar structure and function of the jumper 670 as previously discussed, but the examples highlight the propagation of the Tx signals within the waveguide 671 of the rigid-plane 672.

Referring now to FIG. 7A, yet another example of a pluggable optical transceiver module 700 including an example of a CWDM block 740 (indicated by a dashed line box) embedded within a single-plane transitional-layers rigid-plane optical jumper 770. FIG. 7A shows a substantially similar structure and function of the jumper with the embedded CWDM previously discussed in FIG. 6A above. Thus, for purposes of brevity, structures and functions that are the same as previously described are not discussed in details again in reference to FIG. 7A. However, because the optical jumper 770 in FIG. 7A has transitional-layers in its configuration, the Tx waveguides 771*b* and the Rx waveguides 771*a* are on different planes (XZ plane) in the CWDM block 740 within the rigid-plane 772. As previously described, the proximal end of the jumper 770 can couple to the ferrule adapter 780 that is installed on the faceplate 705. At this interface point of the jumper 770 at the faceplate 705, the Tx signals and the Rx signals enter the rigid-plane 772 in the same plane. Thus, the waveguides 771*a*, 771*b* are shown to "overlap" at the proximal end of the jumper 770. Moreover, the rigid-plane 772 may have narrower dimension at the proximal end at the faceplate 705 to take advantage of potentially denser faceplate connector pitch (e.g., to support parallel-fiber ferrules such as MT ferrule in a MPO optical cable connector). Although FIG. 7B shows with similar pitch for the waveguides 771a, 771b, the waveguide pitch at the proximal end, in the middle of the jumper 770, and at the distal end interfacing to the turning lenses 742a, 742b may be different. For example, the pitch of the waveguides 771a, 771b at the proximal end in the ferrule adapter 780 may be at 250 um for the waveguide ends to be coupled with an MT ferrule; the pitch of the distal end of the waveguides 771a, 771b at the interface point to the turning lenses 742a, 742b may be at 350 um to accommodate discrete arrays of opto-electronics; the pitch among the waveguides 771a and the pitch among the waveguides 771b may be at 300 um to minimize optical signal cross talks; and the separation between waveguides 771a and 771b may be 300 um also to minimize optical signal cross talks.

The glass block of the rigid-plane 772 has a particular geometry that enables the waveguides 771a, 771b to gradually increase an offset distance from each other, along the length of the rigid-plane 772. Accordingly, the waveguides 771a, 771b transition within the rigid-plane 772 from being grouped in one plane at the faceplate 705 interface (coupling with the ferrule adapter 780) to being on separate planes at the interface with the micro-optics of the CWDM block 740. To accommodate the transitional-layers, the CWDM block 740 embedded within the rigid-plane 772 includes two sets of turning lenses that correspond to the waveguides 771a, 771b. In the example, Rx waveguide 771a interfaces with turning lens 742a and Tx waveguide 771b interfaces with turning lens 742b.

FIG. 7B is a top view of the single-plane transitional-layers rigid-plane optical jumper 770. In this illustrated example, the various Rx waveguides 771a and the Tx waveguides 771b are shown within the rigid-plane 772. Also, FIG. 7B serves to illustrate that these waveguides 771a, 771b interface with the CWDM elements, namely the turning lenses, that are embedded within the rigid-plane 772. As seen, the receive optical signals traverse from Rx waveguides 771a, deflected by the turning lens 742, zig-zag between the relay mirrors 741a and the filter arrays 744 which selectively allow specific wavelengths-to passthrough the filter arrays 744, and finally coupling to the PD arrays (not shown). Similarly, the transmit optical signals traverse from VCSELs 731, pass through the filter array 744, zig-zag between the relay mirrors 741b and the filter array 744, deflected by the turning lenses 742b, and eventually couple into Tx waveguides 771b.

FIG. 8A illustrates yet another example of a pluggable optical transceiver module 800 including an example configuration for a single-plane multi-layer rigid-plane optical jumper 870 including a CWDM block 840 (indicated by dashed line box) embedded within. FIG. 8A shows a substantially similar structure and function of the jumper with the embedded CWDM previously discussed in FIG. 6A above. Thus, for purposes of brevity, structures and functions that are the same as previously described are not discussed again in details in reference to FIG. 8A. However, the Rx waveguides 871a and the Tx waveguides 871b are on different planes for the length of the rigid-plane 872 from the ferrule adapter 880 to the CWDM block 840. As seen, at the interface between the ferrule adapter 880 and the proximal end of the rigid-plane 872, Rx waveguides 871a and the Tx waveguides 871b are on different planes having an offset distance between them. This distance between the Rx waveguides 871a and the Tx waveguides 871b does not need to be the same within the rigid-plane 872 from the cable connector interface portion of the jumper 870, but the Rx waveguides 871a and the Tx waveguides 871b are kept separated on different planes, all the way to the embedded CWDM block 840. The distance between the Rx waveguides 871a and the Tx waveguides 871b in the cable connector interface portion of the jumper 870 may be implemented to have the same pitch as the duplex ferrules pitch within an optical cable connector that will be installed in the ferrule adapter 880. The distance between the Rx waveguides 871a and the Tx waveguides 871b in the CWDM block 840 interface portion may be sized depending on the positions of the receive relay mirror 841a vs. the Tx relay mirrors 841b. The zig-zag optical path is maintained between the Rx relay mirrors 841a and the filter array 844 for the receive signals as shown in FIG. 8A. Since the Tx waveguides 871b are at a lower plane with respect to the Rx waveguides 871a in this example, the Tx relay mirrors 841b (as shown in FIG. 8B, but not in FIG. 8A for simplicity) need to be between the Rx relay mirrors 841a and the filter array 844. To maintain the zig-zag optical path the VCSEL arrays 831 may be offset with respect to the PD arrays (not shown). Therefore, the Tx waveguides 871b will be at the elevation of the Tx turning lenses 842b. The distance between the Tx waveguides 871b and the Rx waveguides 871a may be varying between the faceplate connector interface portion and the CWDM block 840 interface portion of the jumper 870.

In addition, the module 800 includes a heat sink 810 that is positioned above the transceiver board 851 housing the ASIC. Further, a portion of the rigid-plane 872, comprising the embedded CWDM block 840 and the optical socket 830, are positioned under a retainer plate 815 within the module 800. The retainer plate 815 can be a rigid support structure that is affixed to the module 800 in a certain position, and placing slight force to the top of the rigid-plane 872 to retain the jumper 870 in a stable position. In the illustrated example, the retainer plate 815 is attached to heat sink 810 using a mounting screw 812.

In FIG. 8B, a top view of the single-plane multi-layer rigid-plane optical jumper 870 more prominently illustrates the rigid-plane 872 positioned under the retainer plate 815. A portion of the rigid-plane 872 can be placed within an area of the retainer plate 815, namely a retainer pocket 816 (indicated by dashed lines). Under the retainer pocket 816, the rigid-plane 872 is allowed movement (within a tolerance) in order to be aligned to socket walls and socket backstop of the optical socket 830. The jumper 870 bottoms out on socket floor and fully seats to the optical socket 830, while under the retainer plate 815. Also, rear mounting holes 811a, 811b may be shaped complementarily to front mounting holes to allow for some movement of the rigid-plane 872 within the retainer pocket 816 under the retainer plate 815 in order for the CWDM block 840 of the rigid-plane 872 to properly mate with the optical socket 830. Gaskets 813 under the retainer plate 815 can provide even pressure on the rigid-plane 872. Also, FIG. 8B shows an example where there are multiple ferrule adapters 880a-880d coupled to the rigid-plane 872. Each of the ferrule adapters 880a-880d corresponds to a pair of a Rx waveguide and a Tx waveguide. For instance, ferrule adapter 880a (being a duplex ferrule connector) corresponds to Rx waveguide 871a and Tx waveguide 871b. These waveguides, such as Rx waveguide 871a and Tx waveguide 871b, are in a predefined sequence to vertically line-up for each of the ferrule adapters 880a-880d, as illustrated with the optical signal lane numbers 879 (0, 1, 2 and 3). The waveguides continue to the micro-optics of the CWDM block 840. As seen, the receive optical signals traverse from Rx waveguides 871a, deflected by the Rx turning lens 842a, zig-zag between the Rx relay mirrors 841a and the filter arrays 844 which selectively allow specific wavelengths to pass through the filter arrays 844, and finally coupling to the PD arrays (not shown). Similarly, the transmit optical signals traverse from VCSEL arrays 831, pass through the filter array 844, zig-zag between the Tx relay mirrors 841b and the filter array 844, deflected by the Tx turning lenses 842b, and eventually couple into Tx waveguides 871b. Accordingly, the jumper 870 acts as an opto-mechanical interface from the external cables (terminated at the ferrule adapters 880a-880d) to the optical socket 830.

Figure 9:
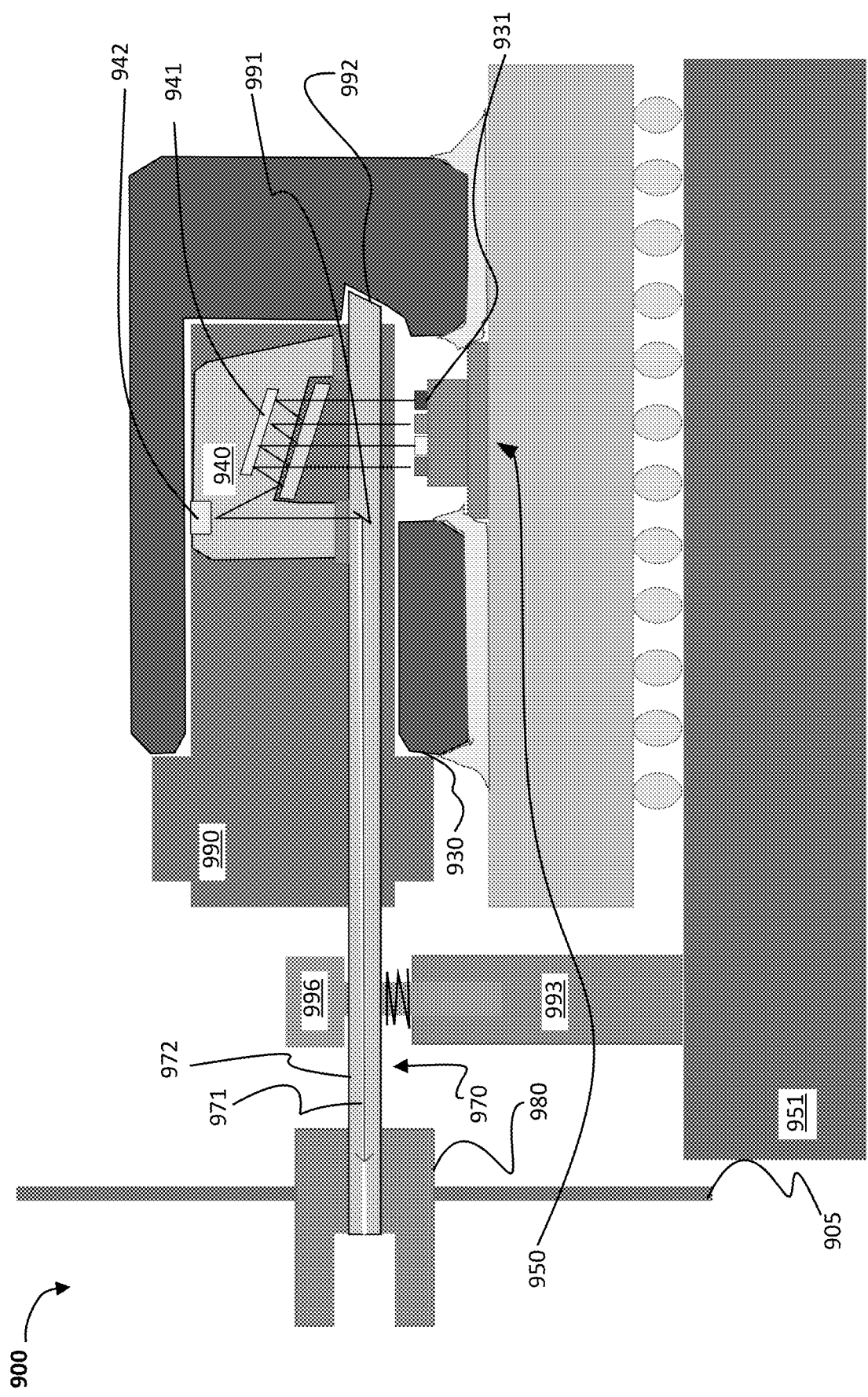
FIG. 9 illustrates yet another example of a pluggable optical transceiver module including another example configuration for a rigid-plane optical jumper, including a CWDM block bolt on a single-plane single-layer rigid-plane optical jumper, in accordance with an embodiment of the technology disclosed herein.

FIG. 9 illustrates yet another example of a pluggable optical transceiver module 900 including an example configuration for a single-plane single-layer rigid-plane optical jumper 970 having a CWDM block 940 bolted thereon. FIG. 9 shows a substantially similar structure and function of the jumper with the embedded CWDM previously discussed in FIG. 6A above. Thus, for purposes of brevity, structures and functions that are the same as previously described are not discussed again in detail again in reference to FIG. 9. However, the single-plane single-layer rigid-plane optical jumper 970 has a CWDM block 940 that is bolted on top of the rigid-plane 972. Accordingly, the CWDM block 940 and its associated micro-optics are arranged above (at a higher height in the Y-axis) the rigid-plane 972. FIG. 9 shows that a bolt 996 can be used to secure the CWDM block 940 to a top surface of the rigid-plane 972 at the distal end (optical socket interface portion) of the jumper 970. Thus, the CWDM block 940 is bolted and rigidly fixed to the jumper 970 in a position that is aligned with the optical socket 930 and the opto-electronics of the optical transceiver 950. To address the CWDM block 940 being arranged on top of the rigid-plane 972, and thus being on a higher plane than the waveguide 971, a reflective mirror 991 is placed at the end of the waveguide 971. The reflective mirror 991 can direct receiving light from the waveguide 971 upwards towards the micro-optics of the CWDM block 940. In the illustrated example, light reflects off of the reflective mirror 991 and travels up to be reflected towards the micro-optics of the CWDM block 940 by the turning lens 942. As a result, the jumper 970 can be optically coupled to the CWDM block 940, and in turn, opto-mechanically coupled to the opto-electronics within the optical socket 930. The distal end of the jumper 970 may be housed within a chip optical connector 990. The chip optical connector in conjunction with the jumper 970 may have alignment features 992 for the chip optical connector 990 to be seated within the optical socket 930 so that the CWDM block 940 is aligned with the opto-electronics of the optical transceiver 950.

Figure 10B:
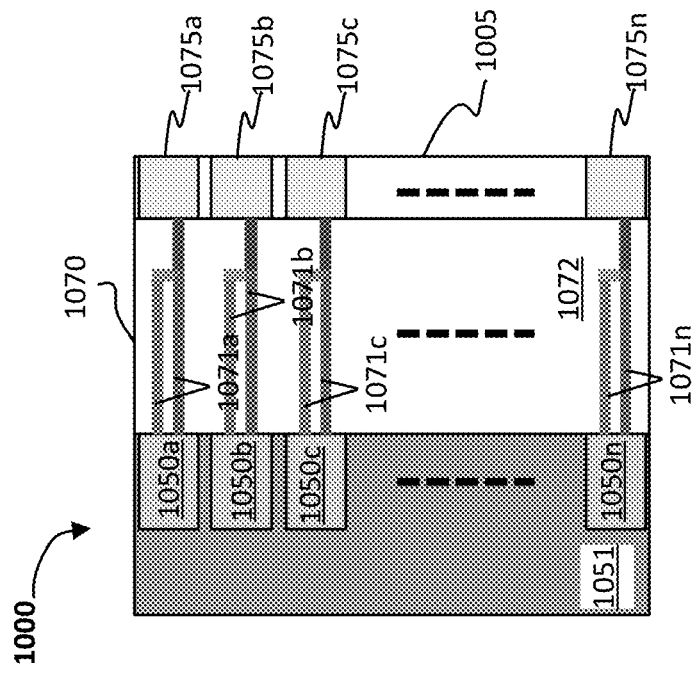
FIG. 10B illustrates another example of a pluggable optical transceiver module having multiple transceiver chips and including a rigid-plane optical jumper providing opto-mechanical connections to vertically oriented faceplate connectors, in accordance with an embodiment of the technology disclosed herein.
Figure 10A:
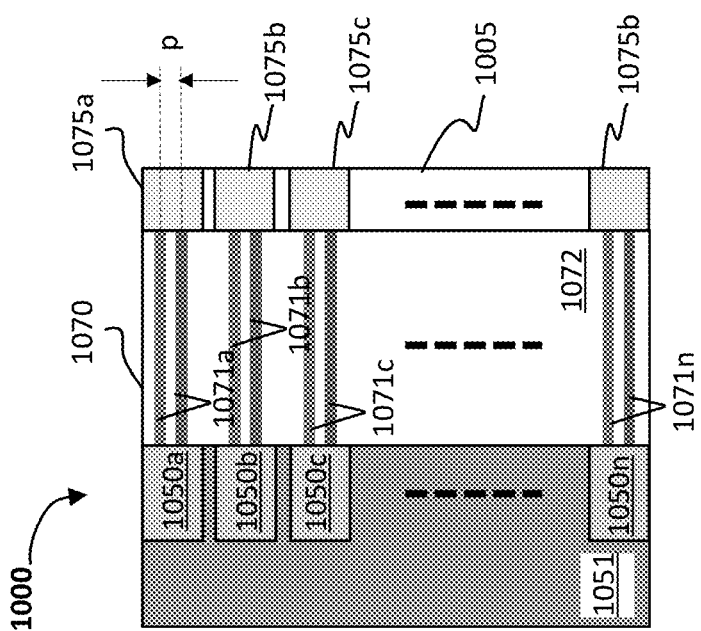
FIG. 10A illustrates an example of a pluggable optical transceiver module having multiple transceiver chips and including a rigid-plane optical jumper providing opto-mechanical connections to horizontally oriented faceplate connectors, in accordance with an embodiment of the technology disclosed herein.

FIG. 10A shows a top view of an example of a pluggable optical transceiver module 1000 with multiple CWDM transceivers 1050a-1050n integrated in the module 1000. For example, each of the CWDM transceivers 1050a-1050n includes a transmitter and receiver pair. To support several CWDM transceivers 1050a-1050n in one module 1000, the module 1000 includes a rigid-plane optical jumper 1070 that is designed to provide opto-mechanical connections to each of these individual CWDM transceivers 1050a-1050n. In the illustrated example, the module 1000 includes horizontally oriented ferrule adapters 1075a-1075n that may be mounted to the faceplate 1005. The optical cable connectors (not shown) can be implemented as duplex ferrule connectors. Thus, the optical cable connectors can be oriented horizontally having the two ferrules side-by-side (with respect to horizontal plane) when installed in a ferrule adapters 1075a-1075n. In order to support this configuration of module 1000, the rigid-plane optical jumper 1070 is used. This jumper 1070 can be implemented as a HMWG 1072 that having multiple rigid waveguide pairs 1071a-1071n (having a dedicated Tx waveguide and Rx waveguide) formed within the HMWG 1072. Each of the rigid waveguide pairs 1071a-1071n correspondingly interfaces with each of the CWDM transceivers 1050a-1050n. As seen, waveguide pair 1071a couples to CWDM transceiver 1050a; waveguide pair 1071b couples to CWDM transceiver 1050b; waveguide pair 1071c couples to CWDM transceiver 1050c; and waveguide pair 1071n couples to CWDM transceiver 1050n.

FIG. 10A also illustrates a pitch p between the individual simplex ferrules within a duplex ferrule connector. This pitch is the same distance that is maintained between the two waveguides in a waveguide pairs 1071a-1071n in the faceplate connector interface portion. Thus, when an external optical cable connector is installed through the faceplate and interfaces with the jumper 1070, each of the ferrules will align with the corresponding waveguide. For instance, an external optical connector received by ferrule adapter 1075a will have a ferrule that aligns with Tx waveguide and a ferrule that aligns with the Rx waveguide of the waveguide pair 1071a. Further, a pitch between each of the CWDM transceiver chips 1050a-1050n may also be the same as the distance maintained between each of the waveguide pairs 1071a-1071n in the HMWG 1072. In other words, the pitch between CWDM transceiver chips 1050a and 1050b is the same pitch between the rigid waveguide pair 1071a and 1071b within the HMWG 1072.

FIG. 10B illustrates a top view of an example of a pluggable optical transceiver module 1000 with multiple CWDM transceiver chips 1050a-1050n, and having a rigid-plane optical jumper 1070 that is designed to provide opto-mechanical connections to each of these individual CWDM transceivers 1050a-1050n. FIG. 10B shows a substantially similar structure and function of the jumper discussed in FIG. 10A above. Thus, for purposes of brevity, structures and functions that are the same as previously described are not discussed again in detail again in reference to FIG. 10B. However, the external optical cable connectors (not shown) can be arranged in a vertical orientation when installed in the ferrule adapters 1075a-1075b. To accommodate this configuration of module 1000, the rigid-plane optical jumper 1070 includes waveguide pairs 1071a-1071n that route the Tx waveguide to orient above (or below) the Rx waveguide at the faceplate 1005. To achieve this offset between the Tx waveguide and the Rx waveguide within the HMWG 1072, a mirror can be included to deflect Tx signals 90 degrees upward (out of plane), a mirror to deflect Tx signals 90 degrees in-plane, and a mirror to deflect the Tx signals toward faceplate 1005. After deflection, the Tx waveguide and Rx waveguide of each of the waveguide pairs 1071a-1071n are at the appropriate pitch to be aligned with the CWDM transceiver 1050a-1050n.

Figure 11B:
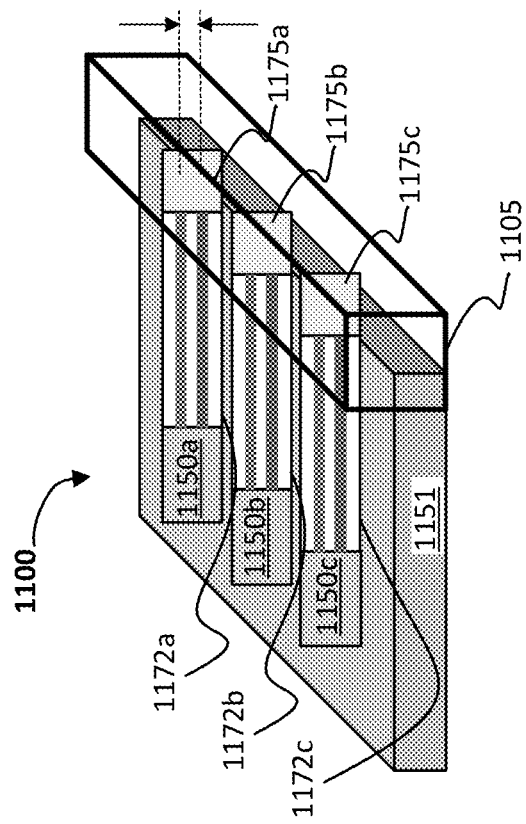
FIG. 11B illustrates another example of a pluggable optical transceiver module having multiple transceiver chips and including multiple rigid-plane optical jumpers providing opto-mechanical connections to vertically oriented faceplate connectors, in accordance with an embodiment of the technology disclosed herein.
Figure 11A:
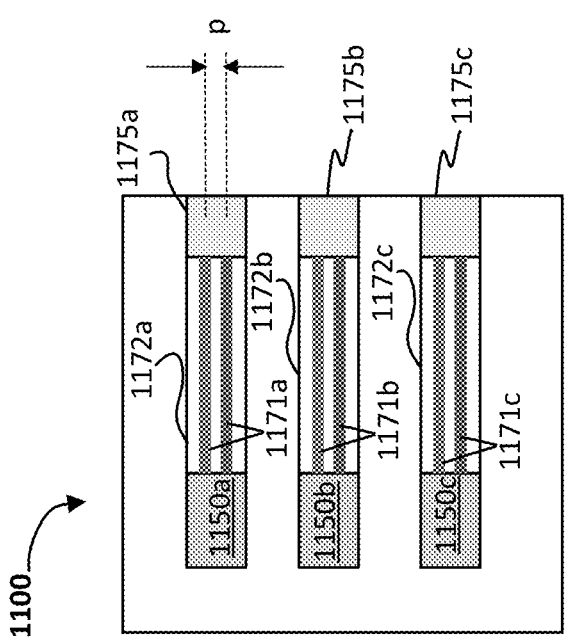
FIG. 11A illustrates another example of a pluggable optical transceiver module having multiple transceiver chips and including multiple rigid-plane optical jumpers providing opto-mechanical connections to horizontally oriented faceplate connectors, in accordance with an embodiment of the technology disclosed herein.

FIG. 11A illustrates a top view of an example of a pluggable optical transceiver module 1100 with multiple CWDM transceivers 1150a-1150c. As general description, each of the CWDM transceivers 1150a-1150c are coupled to a corresponding waveguide block (having a waveguide pair integrated therein), where each waveguide block is coupled to a corresponding ferrule adapter. Particularly, FIG. 11A shows: a HMWG 1172a coupled to ferrule adapter 1175a and CWDM transceiver 1150a, having waveguide pair 1171a to interface with each ferrule of the duplex ferrule optical cable connector horizontally installed in the ferrule adapter 1175a; HMWG 1171b coupled to ferrule adapter 1175b and CWDM transceiver 1150b, having waveguide pair 1171b to interface with each ferrule of the duplex ferrule optical cable connector horizontally installed in the ferrule adapter 1175*b*; and HMWG 1171*c* coupled to ferrule adapter 1175*c* and CWDM transceiver 1150*c*, having waveguide pair 1171*c* to interface with each ferrule of the duplex ferrule optical cable connector horizontally installed in the ferrule adapter 1175*c*. Thus, the rigid-plane optical jumpers, namely the HMWGs 1172*a*-1172*c* provide an opto-mechanical interface between the ferrules of the external optical cable connector and the CWDM transceivers 1150*a*-1150*c*.

FIG. 11B illustrates an example of a pluggable optical transceiver module 1100 with multiple CWDM transceivers 1150*a*-1150*c* and having a HMWGs 1172*a*-1172*c* that are designed to provide opto-mechanical connections to each of these individual CWDM transceivers 1050*a*-1050*c*. FIG. 11B shows a substantially similar structure and function of the jumper discussed in FIG. 11A above. Thus, for purposes of brevity, structures and functions that are the same as previously described are not discussed again in detail again in reference to FIG. 11B. However, the external optical cable connectors (not shown) can be arranged in a vertical orientation when installed in the ferrule adapters 1175*a*-1175*c*.

To accommodate this configuration of module 1100, the CWDM transceiver chips 1150*a*-1150*c* are also vertically arranged on the transceiver board 1051, such that the chip sits upright off of the board (rather than lying horizontally flat against the surface of the board 1051). For example, a high speed flex circuit can be used to implement this vertical arrangement of the CWDM transceivers chips 1150*a*-1150*c*. Similar, the HMWGs 1172*a*-1172*c* and the ferrule adapters 1175*a*-1175*c* are also vertically oriented off of the transceiver board 1151. As an example, the CWDM transceiver chip 1150*c*, the corresponding HMWG 1172*c*, and the ferrule adapter 1175*c* may be vertically arranged to form a 90° angle from surface of the board 1151. Other mechanisms can be employed to support this configuration, for instance a card edge connector (vertical insertion) may be employed and electrical connection to the transceiver board 1151 utilized.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
    an external optical cable connector inserted through a faceplate, wherein the external optical cable duplex connector is vertically oriented and comprises an external cable terminated thereon;
    opto-electronics of an optical transceiver coupled to a transceiver board;
    an optical socket coupled to the transceiver board, wherein the optical socket enables an opto-mechanical interface with the opto-electronics of the optical transceiver; and
    a rigid-plane optical jumper, comprising:
        a coarse wave-division multiplexing (CWDM) block coupled to the optical socket; and
        two rigid-planes, wherein each of the two rigid-planes comprise a waveguide plate integrated therein and each of the two waveguide plates couple to the vertically oriented external optical cable duplex connector at a proximal end and each of the two waveguide plates couple to the CWDM block at a distal end in a manner that forms an opto-mechanical interface between the external optical cable duplex connector and the optical socket and enabling the opto-electronics of the optical transceiver to transmit and receive optical signals via the external cable.

2. The system of claim 1, wherein each of the two waveguide plates couple to the vertically oriented external optical cable duplex connector in a separate plane.

3. The system of claim 2, wherein a first waveguide plate of the two waveguide plates couples to the first simplex ferrule of the vertically oriented external optical cable duplex connector in an upper plane.

4. The system of claim 3, wherein the first waveguide plate of the two waveguide plates is configured to propagate transmit signals via the waveguide integrated therein.

5. The system of claim 2, wherein a second waveguide plate of the two waveguide plates couples to the second simplex ferrule of the vertically oriented external optical cable duplex connector in a lower plane.

6. The system of claim 5, wherein the second waveguide plate of the two waveguide plates is configured to propagate receive signals via the waveguide integrated therein.

7. The system of claim 2, wherein each of the two rigid waveguide plates couples to the CWDM block in a separate plane.

8. A system comprising:
    an external optical cable duplex connector inserted through a faceplate, wherein the external optical cable duplex connector is vertically oriented and comprises an external cable terminated thereon;
    opto-electronics of an optical transceiver coupled to a transceiver board;
    an optical socket coupled to the transceiver board, wherein the optical socket enables an opto-mechanical interface with the opto-electronics of the optical transceiver; and
    a rigid-plane optical jumper, comprising:
        a coarse wave-division multiplexing (CWDM) block coupled to the optical socket; and
        a glass block comprising two waveguides integrated therein, wherein the glass block couples to the vertically oriented external optical cable duplex connector at a proximal end and couples to the CWDM block at a distal end in a manner that forms an opto-mechanical interface between the external cable duplex connector and the optical socket and enabling the opto-electronics of the optical transceiver to transmit and receive optical signals via the external fiber.

9. The system of claim 8, wherein the CWDM block at the optical socket interface portion, wherein the CWDM block comprises micro-optics, and mechanically coupling the CWDM block to the optical socket optically couples the micro-optics in the CWDM block to the opto-electronics of the optical transceiver.

10. The system of claim 9, wherein the two waveguide plates integrated in the glass block are in two separate planes, the waveguide in the waveguide plate corresponding to the first plane is configured to propagate transmit signals, and the waveguide in the waveguide plate corresponding to the second plane is configured to propagate receive signals.

* * * * *